(12) United States Patent
Camacho Cardenas et al.

(10) Patent No.: US 11,959,823 B2
(45) Date of Patent: Apr. 16, 2024

(54) MEASURING BACKLASH OF A DRIVE TRAIN

(71) Applicant: Schlumberger Technology Corporation, Sugar Land, TX (US)

(72) Inventors: Alejandro Camacho Cardenas, Houston, TX (US); Michael Raymond Netecke, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 694 days.

(21) Appl. No.: 17/029,758

(22) Filed: Sep. 23, 2020

(65) Prior Publication Data

US 2022/0090985 A1    Mar. 24, 2022

(51) Int. Cl.
| | |
|---|---|
| G01M 13/02 | (2019.01) |
| F16H 57/01 | (2012.01) |
| E21B 3/02 | (2006.01) |
| E21B 19/00 | (2006.01) |
| E21B 19/15 | (2006.01) |

(Continued)

(52) U.S. Cl.
CPC ............ *G01M 13/02* (2013.01); *F16H 57/01* (2013.01); *E21B 3/022* (2020.05); *E21B 19/008* (2013.01); *E21B 19/155* (2013.01); *E21B 19/165* (2013.01); *E21B 21/01* (2013.01); *E21B 21/065* (2013.01); *F04B 51/00* (2013.01)

(58) Field of Classification Search
CPC ............................... F16H 57/01; G01M 13/02
USPC ........................................................ 702/34
See application file for complete search history.

(56) References Cited

U.S. PATENT DOCUMENTS

| | | | |
|---|---|---|---|
| 8,920,146 B2 | 12/2014 | Heinrichs | |
| 9,645,565 B2 * | 5/2017 | Nilsson | .................. B25J 9/1641 |

(Continued)

FOREIGN PATENT DOCUMENTS

| | | |
|---|---|---|
| CN | 113113984 A | 7/2021 |
| JP | 2011501030 A | 1/2011 |

OTHER PUBLICATIONS

Clarivate Analytics, Fixing Device for Oil Pump in Refrigeration Compressor, Jan. 2011, machine translation of JP-2011501030-A, 26 pages.

(Continued)

*Primary Examiner* — Ricky Go
(74) *Attorney, Agent, or Firm* — Pangrle Patent, Brand + Design Law, P.C.

(57) ABSTRACT

Apparatus and methods for measuring backlash of a drive train of an equipment unit. The drive train may comprise an input member operatively connected with an actuator and an output member operatively connected with a work portion of the equipment unit. An example apparatus may include a sensor operable to facilitate operational measurements indicative of an operational parameter associated with the drive train, and a processing device operable to cause the actuator to move the input member until the output member moves, record the operational measurements while the actuator moves the input member, and determine a backlash of the drive train by determining a difference between the operational measurements when the input member starts to move and the operational measurements when the output member starts to move.

19 Claims, 4 Drawing Sheets

(51) Int. Cl.
*E21B 19/16* (2006.01)
*E21B 21/01* (2006.01)
*E21B 21/06* (2006.01)
*F04B 51/00* (2006.01)

(56) References Cited

U.S. PATENT DOCUMENTS

| | | |
|---|---|---|
| 2002/0170301 A1 | 11/2002 | Loprete |
| 2004/0028540 A1 | 2/2004 | Peck |
| 2004/0219040 A1 | 11/2004 | Kugelev |
| 2006/0036402 A1* | 2/2006 | Deller .................. F15B 19/005 702/183 |
| 2006/0060078 A1* | 3/2006 | Deller ...................... B64F 5/60 91/1 |
| 2007/0082787 A1* | 4/2007 | Houtman ........... B60K 23/0808 477/180 |
| 2009/0232674 A1 | 9/2009 | Fiorenza |
| 2011/0237386 A1* | 9/2011 | Hirtt .................... G05B 19/404 477/3 |
| 2020/0158599 A1* | 5/2020 | Best ........................ G08B 5/36 |
| 2020/0325770 A1 | 10/2020 | Camacho Cardenas |
| 2021/0316451 A1* | 10/2021 | Kumar .................... B25J 9/163 |
| 2022/0065242 A1 | 3/2022 | Netecke |

OTHER PUBLICATIONS

Notice of Allowance issued in U.S. Appl. No. 17/009,259 dated Dec. 8, 2022, 16 pages.

Motor, compressor and refrigeration device, Jul. 2021, machine translation of CN-113113984-A, 22 pages.

BenTEC, "Mud Pumps", benTEC brochure, www.bentec.com, Feb. 2018, 5 pages.

\* cited by examiner

MEASURING BACKLASH OF A DRIVE TRAIN

BACKGROUND OF THE DISCLOSURE

Wells are generally drilled into the ground or ocean bed to recover natural deposits of oil, gas, and other materials that are trapped in subterranean formations. Well construction operations (e.g., drilling operations) may be performed at a wellsite by a well construction system (i.e., a drill rig) having various automated surface and subterranean well construction equipment operating in a coordinated manner. For example, a drive mechanism, such as a top drive or a rotary table located at a wellsite surface, may be utilized to rotate and advance a drill string into a subterranean formation to drill a wellbore. The drill string may include a plurality of drill pipes coupled together and terminating with a drill bit. Length of the drill string may be increased by adding additional drill pipes while depth of the wellbore increases. A drilling fluid (i.e., drilling mud) may be pumped by mud pumps from the wellsite surface down through the drill string to the drill bit. The drilling fluid lubricates and cools the drill bit, and carries drill cuttings from the wellbore back to the wellsite surface. The drilling fluid returning to the surface may then be cleaned and again pumped through the drill string.

Some of the well construction equipment comprise a prime mover (e.g., an engine or an electric motor) and a work portion configured to perform work as part of the well construction operations. A drive train (e.g., a gear box or transmission) may be operatively connected between the prime mover and the work portion to transfer mechanical power from the prime mover to the work portion, thereby driving the work portion. Some of the well construction equipment utilize large quantities of mechanical power during the well construction operations, causing wear and/or degradation of the drive train. Such wear and/or degradation is often detected late, resulting in severe damage to or failure of the drive train. Equipment failures during well construction interrupt and lower efficiency of the well construction operations.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus including a system for monitoring operational health of an equipment unit. The equipment unit includes a work portion, a drive train, and an actuator. The actuator drives the work portion via the drive train. The drive train includes an input member operatively connected with the actuator. The drive train also includes an output member operatively connected with the work portion. The system includes a sensor to facilitate operational measurements indicative of an operational parameter associated with the drive train. The system also includes a processing device having a processor and memory storing computer program code. The processing device is communicatively connected with the actuator and the sensor. The processing device causes the actuator to move the input member until the output member moves, records the operational measurements while the actuator moves the input member, and determines a backlash of the drive train by determining a difference between the operational measurements when the input member starts to move and the operational measurements when the output member starts to move.

The present disclosure also introduces an apparatus including a system for monitoring operational health of an equipment unit. The equipment unit includes a work portion, a drive train, and an actuator. The actuator drives the work portion via the drive train. The drive train includes an input member operatively connected with the actuator. The drive train also includes an output member operatively connected with the work portion. The system includes an input load sensor to facilitate load measurements indicative of a load transmitted by the input member. The system also includes a processing device having a processor and memory storing computer program code. The processing device is communicatively connected with the actuator and the input load sensor. The processing device causes the actuator to move the input member until the output member moves, records the load measurements while the actuator moves the input member, and determines a backlash load of the drive train by determining a difference between the load measurements when the input member starts to move and the load measurements when the output member starts to move.

The present disclosure also introduces an apparatus including a system for monitoring operational health of an equipment unit. The equipment unit includes a work portion, a drive train, and an actuator. The actuator drives the work portion via the drive train. The drive train includes an input member operatively connected with the actuator. The drive train also includes an output member operatively connected with the work portion. The system includes an input load sensor to facilitate load measurements indicative of a load transmitted by the input member. The system also includes a processing device having a processor and memory storing computer program code. The processing device is communicatively connected with the actuator and the input load sensor. The processing device causes the actuator to move the input member until the output member moves and records the load measurements while the actuator moves the input member. The processing device also determines a first backlash load of a first pair of engaging members of the drive train by determining a difference between the load measurements when the input member starts to move and the load measurements when the load measurements undergo a first increase. The processing device also determines a second backlash load of a second pair of engaging members of the drive train by determining a difference between the load measurements when the load measurements undergo the first increase and the load measurements when the load measurements undergo a second increase.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is best understood from the following detailed description when read with the accompanying figures. It is emphasized that, in accordance with the standard practice in the industry, various features are not

DETAILED DESCRIPTION

Figure 1:
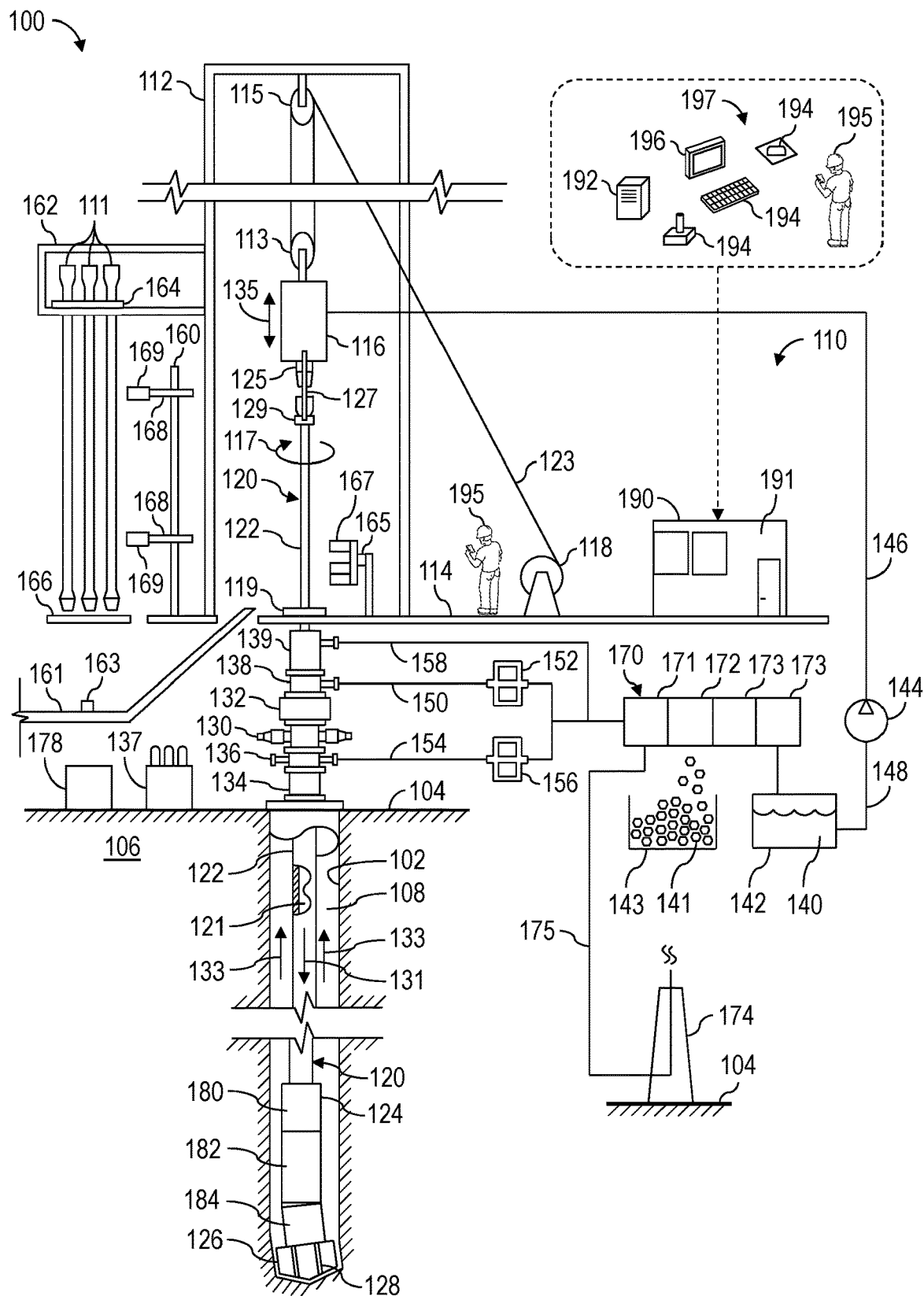
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

FIG. 1 is a schematic view of at least a portion of an example implementation of a well construction system 100 according to one or more aspects of the present disclosure. The well construction system 100 represents an example environment in which one or more aspects of the present disclosure described below may be implemented. The well construction system 100 may be or comprise a drilling rig and associated wellsite equipment collectively operable to construct (e.g., drill) a wellbore 102 extending from a wellsite surface 104 into a subterranean formation 106 via rotary and/or directional drilling. Although the well construction system 100 is depicted as an onshore implementation, the aspects described below are also applicable or readily adaptable to offshore implementations.

The well construction system 100 comprises various well construction equipment, including surface equipment 110 located at the wellsite surface 104 and a drill string 120 suspended within the wellbore 102. The surface equipment 110 may include a mast, a derrick, and/or another support structure 112 disposed over a rig floor 114. The drill string 120 may be suspended within the wellbore 102 from the support structure 112. The support structure 112 and the rig floor 114 are collectively supported over the wellbore 102 by legs and/or other support structures (not shown).

The drill string 120 may comprise a bottom-hole assembly (BHA) 124 and means 122 for conveying the BHA 124 within the wellbore 102. The conveyance means 122 may comprise a plurality of interconnected tubulars, such as drill pipe, heavy-weight drill pipe (HWDP), wired drill pipe (WDP), tough logging condition (TLC) pipe, and drill collars, among other examples. The conveyance means 122 may instead comprise coiled tubing for conveying the BHA 124 within the wellbore 102. A downhole end of the BHA 124 may include or be coupled to a drill bit 126. Rotation of the drill bit 126 and the weight of the drill string 120 collectively operate to form the wellbore 102. The drill bit 126 may be rotated from the wellsite surface 104 and/or via a downhole mud motor 184 connected with the drill bit 126. The BHA 124 may also include various downhole devices and/or tools 180, 182.

The support structure 112 may support a driver, such as a top drive 116, operable to connect (perhaps indirectly) with an upper end of the drill string 120, and to impart rotary motion 117 and vertical motion 135 to the drill string 120, including the drill bit 126. However, another driver, such as a kelly and rotary table (neither shown), may be utilized instead of or in addition to the top drive 116 to impart the rotary motion 117 to the drill string 120. The top drive 116 and the connected drill string 120 may be suspended from the support structure 112 via a hoisting system or equipment, which may include a traveling block 113, a crown block 115, and a drawworks 118 storing a support cable or line 123. The crown block 115 may be connected to or otherwise supported by the support structure 112, and the traveling block 113 may be coupled with the top drive 116. The drawworks 118 may be mounted on or otherwise supported by the rig floor 114. The crown block 115 and traveling block 113 comprise pulleys or sheaves around which the support line 123 is reeved to operatively connect the crown block 115, the traveling block 113, and the drawworks 118. The drawworks 118 may thus selectively impart tension to the support line 123 to lift and lower the top drive 116, resulting in the vertical motion 135. The drawworks 118 may comprise a drum, a base, and a prime mover (e.g., an electric motor) (not shown) operable to drive the drum to rotate and reel in the support line 123, causing the traveling block 113 and the top drive 116 to move upward. The drawworks 118 may be operable to reel out the support line 123 via a controlled rotation of the drum, causing the traveling block 113 and the top drive 116 to move downward.

The top drive 116 may comprise a grabber, a swivel (neither shown), elevator links 127 terminating with an elevator 129, and a drive shaft 125 operatively connected with a prime mover (e.g., an electric motor) (not shown). The drive shaft 125 may be selectively coupled with the upper end of the drill string 120 and the prime mover may be selectively operated to rotate the drive shaft 125 and the drill string 120 coupled with the drive shaft 125. Hence, during drilling operations, the top drive 116, in conjunction with operation of the drawworks 118, may advance the drill string 120 into the formation 106 to form the wellbore 102. The elevator links 127 and the elevator 129 of the top drive 116 may handle tubulars (e.g., drill pipes, drill collars, casing joints, etc.) that are not mechanically coupled to the drive shaft 125. For example, when the drill string 120 is being tripped into or out of the wellbore 102, the elevator 129 may grasp the tubulars of the drill string 120 such that the tubulars may be raised and/or lowered via the hoisting equipment mechanically coupled to the top drive 116. The grabber may include a clamp that clamps onto a tubular when making up and/or breaking out a connection of a tubular with the drive shaft 125. The top drive 116 may have a guide system (not shown), such as rollers that track up and down a guide rail on the support structure 112. The guide system may aid in keeping the top drive 116 aligned with the wellbore 102, and in preventing the top drive 116 from rotating during drilling by transferring reactive torque to the support structure 112.

The drill string 120 may be conveyed within the wellbore 102 through various fluid control devices disposed at the wellsite surface 104 on top of the wellbore 102 and perhaps below the rig floor 114. The fluid control devices may be operable to control fluid within the wellbore 102. The fluid control devices may include a blowout preventer (BOP) stack 130 for maintaining well pressure control comprising a series of pressure barriers (e.g., rams) between the wellbore 102 and an annular preventer 132. The fluid control devices may also include a rotating control device (RCD) 138 mounted above the annular preventer 132. The fluid control devices 130, 132, 138 may be mounted on top of a wellhead 134. A power unit 137 (i.e., a BOP control or closing unit) may be operatively connected with one or more of the fluid control devices 130, 132, 138 and operable to actuate, drive, operate, or otherwise control one or more of the fluid control devices 130, 132, 138. The power unit 137 may be or comprise a hydraulic fluid power unit fluidly connected with the fluid control devices 130, 132, 138 and selectively operable to hydraulically drive various portions (e.g., rams, valves, seals, etc.) of the fluid control devices 130, 132, 138. The power unit 137 may comprise one or more hydraulic pumps actuated by electric motors and operable to pressurize hydraulic fluid for operating the fluid control devices 130, 132, 138, as described herein.

The well construction system 100 may further include a drilling fluid circulation system or equipment operable to circulate fluids between the surface equipment 110 and the drill bit 126 during drilling and other operations. For example, the drilling fluid circulation system may be operable to inject a drilling fluid from the wellsite surface 104 into the wellbore 102 via an internal fluid passage 121 extending longitudinally through the drill string 120. The drilling fluid circulation system may comprise a pit, a tank, and/or other fluid container 142 holding the drilling fluid 140 (i.e., drilling mud), and one or more mud pump units 144 (i.e., drilling fluid pumps) operable to move the drilling fluid 140 from the container 142 into the fluid passage 121 of the drill string 120 via a fluid conduit 146 extending from the pump units 144 to the top drive 116 and an internal passage extending through the top drive 116. Each pump unit 144 may comprise a fluid pump (not shown) operable to pump the drilling fluid 140 and a prime mover (e.g., an electric motor) (not shown) operable to drive the corresponding fluid pump. The fluid conduit 146 may comprise one or more of a pump discharge line, a stand pipe, a rotary hose, and a gooseneck connected with a fluid inlet of the top drive 116. The pumps 144 and the container 142 may be fluidly connected by a fluid conduit 148, such as a suction line.

During drilling operations, the drilling fluid may continue to flow downhole through the internal passage 121 of the drill string 120, as indicated by directional arrow 131. The drilling fluid may exit the BHA 124 via ports 128 in the drill bit 126 and then circulate uphole through an annular space 108 of the wellbore 102 defined between an exterior of the drill string 120 and the wall of the wellbore 102, such flow being indicated by directional arrows 133. In this manner, the drilling fluid lubricates the drill bit 126 and carries formation cuttings uphole to the wellsite surface 104. The returning drilling fluid may exit the annular space 108 via different fluid control devices during different stages or scenarios of well drilling operations. For example, the drilling fluid may exit the annular space 108 via a bell nipple 139, the RCD 138, or a ported adapter 136 (e.g., a spool, cross adapter, a wing valve, etc.) located above one or more rams of the BOP stack 130.

During normal drilling operations, the drilling fluid may exit the annular space 108 via the bell nipple 139 and then be directed toward drilling fluid reconditioning equipment 170 via a fluid conduit 158 (e.g., a gravity return line) to be cleaned and/or reconditioned, as described below, before being returned to the container 142 for recirculation. During managed pressure drilling operations, the drilling fluid may exit the annular space 108 via the RCD 138 and then be directed into a choke manifold 152 (e.g., a managed pressure drilling choke manifold) via a fluid conduit 150 (e.g., a drilling pressure control line). The choke manifold 152 may include at least one choke and a plurality of fluid valves (neither shown) collectively operable to control the flow through and out of the choke manifold 152. Backpressure may be applied to the annular space 108 by variably restricting flow of the drilling fluid or other fluids flowing through the choke manifold 152. The greater the restriction to flow through the choke manifold 152, the greater the backpressure applied to the annular space 108. The drilling fluid exiting the choke manifold 152 may then pass through the drilling fluid reconditioning equipment 170 before being returned to the container 142 for recirculation. During well pressure control operations, such as when one or more rams of the BOP stack 130 is closed, the drilling fluid may exit the annular space 108 via the ported adapter 136 and be directed into a choke manifold 156 (e.g., a rig choke manifold or a well control choke manifold) via a fluid conduit 154 (e.g., a rig choke line). The choke manifold 156 may include at least one choke and a plurality of fluid valves (neither shown) collectively operable to control the flow of the drilling fluid through the choke manifold 156. Backpressure may be applied to the annular space 108 by variably restricting flow of the drilling fluid (and other fluids) flowing through the choke manifold 156. The drilling fluid exiting the choke manifold 156 may then pass through the drilling fluid reconditioning equipment 170 before being returned to the container 142 for recirculation.

Before being returned to the container 142, the drilling fluid returning to the wellsite surface 104 may be cleaned and/or reconditioned via the drilling fluid reconditioning equipment 170, which may include one or more of liquid gas (i.e., mud gas) separators 171, shale shakers 172, and other drilling fluid cleaning and reconditioning equipment 173. The liquid gas separators 171 may remove formation gases entrained in the drilling fluid discharged from the wellbore 102 and the shale shakers 172 may separate and remove solid particles 141 (e.g., drill cuttings) from the drilling fluid. The drilling fluid reconditioning equipment 170 may further comprise other equipment 173 operable to remove additional gas and finer formation cuttings from the drilling fluid and/or modify chemical and/or physical properties or characteristics (e.g., rheology, density, etc.) of the drilling fluid. For example, the drilling fluid reconditioning equipment 170 may include a degasser, a desander, a desilter, a centrifuge, a mud cleaner, and/or a decanter, among other examples. The drilling fluid reconditioning equipment 170 may further include chemical containers and mixing equipment collectively operable to mix or otherwise add selected chemicals to the drilling fluid returning from the wellbore 102 to modify chemical and/or physical properties or characteristics of the drilling fluid being pumped back into the wellbore 102. Intermediate tanks/containers (not shown) may be utilized to hold the drilling fluid while the drilling fluid progresses through the various stages or portions 171, 172, 173 of the drilling fluid reconditioning equipment 170. The cleaned and reconditioned drilling fluid may be transferred to the fluid container 142, the solid particles 141 removed from the drilling fluid may be transferred to a solids container 143 (e.g., a reserve pit), and/or the removed gas may be transferred to a flare stack 174 via a conduit 175 (e.g., a flare line) to be burned or to a container (not shown) for storage and removal from the wellsite.

The surface equipment 110 may include a tubular handling system or equipment operable to store, move, connect, and disconnect tubulars (e.g., drill pipes) to assemble and disassemble the conveyance means 122 of the drill string 120 during drilling operations. For example, a catwalk 161 may be utilized to convey tubulars from a ground level, such as along the wellsite surface 104, to the rig floor 114, permitting the elevator 129 to grab and lift the tubulars above the wellbore 102 for connection with previously deployed tubulars. The catwalk 161 may have a horizontal portion and an inclined portion that extends between the horizontal portion and the rig floor 114. The catwalk 161 may comprise a skate 163 movable along a groove (not shown) extending longitudinally along the horizontal and inclined portions of the catwalk 161. The skate 163 may be operable to convey (e.g., push) the tubulars along the catwalk 161 to the rig floor 114. The skate 163 may be driven along the groove by a drive system (not shown), such as a pulley system or a hydraulic system. Additionally, one or more racks (not shown) may adjoin the horizontal portion of the catwalk 161. The racks may have a spinner unit for transferring tubulars to the groove of the catwalk 161. The tubular handling system may comprise a plurality of actuators collectively operable to move various portions of the tubular handling equipment to perform the methods and operations described herein. The actuators may be or comprise electric motors and/or hydraulic cylinders and rotary actuators. The hydraulic cylinders and rotary actuators may be powered by hydraulic power packs comprising hydraulic pumps actuated by electric motors to pressurize hydraulic fluid.

Power tongs 165 (e.g., an iron roughneck) may be positioned at the rig floor 114. The power tongs 165 may comprise a torqueing portion 167, such as may include a spinner and a torque wrench comprising a lower tong and an upper tong. The torqueing portion 167 of the power tongs 165 may be moveable toward and at least partially around the drill string 120, such as may permit the power tongs 165 to make up and break out connections of the drill string 120. The power tongs 165 may also be moveable away from the drill string 120, such as may permit the power tongs 165 to move clear of the drill string 120 during drilling operations. The spinner of the power tongs 165 may be utilized to apply low torque to make up and break out threaded connections between tubulars of the drill string 120, and the torque wrench may be utilized to apply a higher torque to tighten and loosen the threaded connections. The power tongs 165 may comprise a plurality of actuators collectively operable to actuate the torqueing portion 167. The actuators may be or comprise electric motors.

A set of slips 119 may be located on the rig floor 114, such as may accommodate therethrough the drill string 120 during tubular make up and break out operations and during the drilling operations. The slips 119 may be in an open position during drilling operations to permit advancement of the drill string 120, and in a closed position to clamp the upper end (i.e., the uppermost tubular) of the drill string 120 to thereby suspend and prevent advancement of the drill string 120 within the wellbore 102, such as during the make up and break out operations.

During drilling operations, the various well construction equipment of the well construction system 100 may progress through a plurality of coordinated well construction operations (i.e., operational sequences) to drill or otherwise construct the wellbore 102. The well construction operations may change based on a digital drilling program, status of the well, status of the subterranean formation, stage of drilling operations (e.g., tripping, drilling, tubular handling, etc.), and type downhole tubulars (e.g., drill pipe) utilized, among other examples.

During drilling operations, the hoisting system lowers the drill string 120 while the top drive 116 rotates the drill string 120 to advance the drill string 120 downward within the wellbore 102 and into the formation 106. During the advancement of the drill string 120, the slips 119 are in an open position, and the power tongs 165 is moved away or is otherwise clear of the drill string 120. When the upper end of the drill string 120 (i.e., upper end of the uppermost tubular of the drill string 120) connected to the drive shaft 125 is near the slips 119 and/or the rig floor 114, the top drive 116 ceases rotating and the slips 119 close to clamp the upper end of the drill string 120. The grabber of the top drive 116 then clamps the uppermost tubular connected to the drive shaft 125, and the drive shaft 125 rotates in a direction reverse from the drilling rotation to break out the connection between the drive shaft 125 and the uppermost tubular. The grabber of the top drive 116 may then release the uppermost tubular.

Multiple tubulars may be loaded on the rack of the catwalk 161 and individual tubulars may be transferred from the rack to the groove in the catwalk 161, such as by the spinner unit. The tubular positioned in the groove may be conveyed along the groove by the skate 163 until the box end of the tubular projects above the rig floor 114. The elevator 129 of the top drive 116 then grasps the protruding box end, and the drawworks 118 may be operated to lift the top drive 116, the elevator 129, and the new tubular.

The hoisting system then raises the top drive 116, the elevator 129, and the new tubular until the tubular is aligned with the upper portion of the drill string 120 clamped by the slips 119. The power tongs 165 is moved toward the drill string 120, and the lower tong of the torqueing portion 167 clamps onto the upper end of the drill string 120. The spinning system threadedly connects the lower end (i.e., pin end) of the new tubular with the upper end (i.e., box end) of the drill string 120. The upper tong then clamps onto the new tubular and rotates with high torque to complete making up the connection with the drill string 120. In this manner, the new tubular becomes part of the drill string 120. The power tongs 165 then releases and moves clear of the drill string 120.

The grabber of the top drive 116 may then clamp onto the drill string 120. The drive shaft 125 is brought into contact with the upper end of the drill string 120 (i.e., the box end of the uppermost tubular) and rotated to make up a connection between the drill string 120 and the drive shaft 125. The grabber then releases the drill string 120, and the slips 119 are moved to the open position. The drilling operations may then resume.

The tubular handling equipment may further include a tubular handling manipulator (THM) 160 disposed in association with a vertical pipe rack 162 for storing tubulars 111 (e.g., drill pipes, drill collars, drill pipe stands, casing joints, etc.). The vertical pipe rack 162 may comprise or support a fingerboard 164 defining a plurality of slots configured to support or otherwise hold the tubulars 111 within or above a setback 166 (e.g., a platform or another area) located adjacent to, along, or below the rig floor 114. The fingerboard 164 may comprise a plurality of fingers (not shown), each associated with a corresponding slot and operable to close around and/or otherwise interpose individual tubulars 111 to maintain the tubulars 111 within corresponding slots of the fingerboard 164. The vertical pipe rack 162 may be connected with and supported by the support structure 112 or another portion of the wellsite system 100. The fingerboard 164/setback 166 provide storage (e.g., a temporary storage) of tubulars 111 during various operations, such as during and between tripping out and tripping of the drill string 120. The THM 160 may comprise a plurality of actuators collectively operable to move various portions of the THM 160 to perform the methods and operations described herein. The actuators may be or comprise electric motors.

The THM 160 may be operable to transfer the tubulars 111 between the fingerboard 164/setback 166 and the drill string 120 (i.e., space above the suspended drill string 120). For example, the THM 160 may include arms 168 terminating with clamps 169, such as may be operable to grasp and/or clamp onto one of the tubulars 111. The arms 168 of the THM 160 may extend and retract, and/or at least a portion of the THM 160 may be rotatable and/or movable toward and away from the drill string 120, such as may permit the THM 160 to transfer the tubular 111 between the fingerboard 164/setback 166 and the drill string 120.

To trip out the drill string 120, the top drive 116 is raised, the slips 119 are closed around the drill string 120, and the elevator 129 is closed around the drill string 120. The grabber of the top drive 116 clamps the upper end of a tubular of the drill string 120 coupled to the drive shaft 125. The drive shaft 125 then rotates in a direction reverse from the drilling rotation to break out the connection between the drive shaft 125 and the drill string 120. The grabber of the top drive 116 then releases the tubular of the drill string 120, and the drill string 120 is suspended by (at least in part) the elevator 129. The power tongs 165 is moved toward the drill string 120. The lower tong clamps onto a lower tubular below a connection of the drill string 120, and the upper tong clamps onto an upper tubular above that connection. The upper tong then rotates the upper tubular to provide a high torque to break out the connection between the upper and lower tubulars. The spinning system then rotates the upper tubular to separate the upper and lower tubulars, such that the upper tubular is suspended above the rig floor 114 by the elevator 129. The power tongs 165 then releases the drill string 120 and moves clear of the drill string 120.

The THM 160 may then move toward the drill string 120 to grasp the tubular suspended from the elevator 129. The elevator 129 then opens to release the tubular. The THM 160 then moves away from the drill string 120 while grasping the tubular with the clamps 169, places the tubular in the fingerboard 164/setback 166, and releases the tubular for storage. This process is repeated until the intended length of drill string 120 is removed from the wellbore 102.

The well construction system 100 may further comprise a power supply system 178 configured to supply electrical and mechanical (e.g., fluid) power for actuating or otherwise powering the surface equipment 110. The power supply system 178 may include one or more electric generators, electrical energy storage devices (e.g., batteries, capacitors, etc.), and fuel storage devices, among other examples. The power supply system 178 may also include various means (not shown) for transferring and/or distributing electrical power, mechanical power, and fuel to the well construction equipment and between various equipment of the power supply system 178, including electrical power conductors, electrical connectors, electrical relays, fluid conductors, fluid connectors, and fluid valves, among other examples.

The surface equipment 110 of the well construction system 100 may also comprise a control center 190 from which various portions of the well construction system 100, such as the top drive 116, the hoisting system, the tubular handling system, the drilling fluid circulation system, the well control system, the BHA 124, among other examples, may be monitored and controlled. The control center 190 may be located on the rig floor 114 or another location of the well construction system 100. The control center 190 may comprise a facility 191 (e.g., a room, a cabin, a trailer, etc.) containing a control workstation 197, which may be operated by rig personnel 195 (e.g., a driller or another human rig operator) to monitor and control various well construction equipment or portions of the well construction system 100. The control workstation 197 may comprise or be communicatively connected with an equipment controller 192 (e.g., a processing device, a computer, etc.), such as may be operable to receive, process, and output information to monitor operations of and provide control to one or more portions of the well construction system 100. For example, the equipment controller 192 may be communicatively connected with the various surface equipment 110 and downhole equipment 120 described herein, and may be operable to receive signals from and transmit signals to such equipment to perform various operations described herein. The equipment controller 192 may store executable computer program code, instructions, and/or operational parameters or set-points, including for implementing one or more aspects of methods and operations described herein. The equipment controller 192 may be located within and/or outside of the facility 191. Although it is possible that the entirety of the equipment controller 192 is implemented within one device, it is also contemplated that one or more components or functions of the equipment controller 192 may be implemented across multiple devices, some or an entirety of which may be implemented as part of the control center 190 and/or located within the facility 191.

The control workstation 197 may be operable for entering or otherwise communicating control data (e.g., commands, signals, information, etc.) to the equipment controller 192 and other equipment controller by the rig personnel 195, and for displaying or otherwise communicating information from the equipment controller 192 to the rig personnel 195. The control workstation 197 may comprise one or more input devices 194 (e.g., a keyboard, a mouse, a joystick, a touchscreen, etc.) and one or more output devices 196 (e.g., a video monitor, a touchscreen, a printer, audio speakers, etc.). Communication between the equipment controller 192, the input and output devices 194, 196, and the various well construction equipment may be via wired and/or wireless communication means. However, for clarity and ease of understanding, such communication means are not depicted, and a person having ordinary skill in the art will appreciate that such communication means are within the scope of the present disclosure.

Other implementations of the well construction system 100 within the scope of the present disclosure may include more or fewer components than as described above and/or depicted in FIG. 1. Additionally, the various well construction equipment and/or subsystems of the well construction system 100 shown in FIG. 1 may include more or fewer components than as described above and depicted in FIG. 1. For example, various engines, motors, hydraulics, actuators, valves, and/or other components not explicitly described herein may be included in the well construction system 100, and are within the scope of the present disclosure.

A piece of well construction equipment (hereinafter referred to as an "equipment unit") described above and shown in FIG. 1 may comprise an actuator (e.g., an electric motor, a combustion engine, a hydraulic motor, etc.), a work portion configured to perform work (e.g., a well construction operation), and a drive train for transferring mechanical power from the actuator to the work portion. A drive train may comprise a plurality of operatively connected (e.g., mechanically connected, engaging, meshing, etc.) components, such as gears (i.e., a gear train), belts, chains, shafts, bearings, couplings, and universal joints, among other examples. A drive train may be or comprise a gear box or transmission of an equipment unit. Each drive train may comprise an input member (e.g., an input shaft) operable to receive mechanical power from the actuator and an output member (e.g., an output shaft, a slide, a piston, a crosshead, etc.) operable to output the mechanical power to the work portion such that the work portion can perform work. Well construction equipment comprising a drive train may include, for example, the mud pump units 144, the top drive 116, the drawworks 118, the power tongs 165, the THM 160, the catwalk 161, and the shale shakers 172. A work portion of the mud pump unit 144 may be or comprise fluid pistons, crossheads, and/or a crankshaft (none shown), a work portion of the top drive 116 may be or comprise the drive shaft 125, a work portion of the drawworks 118 may be or comprise the drum for the support line 123, a work portion of the power tongs 165 may be or comprise the torqueing portion 167, a work portion of the THM 160 may be or comprise the arms 168 and/or the clamps 169, a work portion of the catwalk 161 may be or comprise the skate 163, and a work portion of the shale shaker 172 may be or comprise a shaking screen (not shown).

Backlash (i.e., lash or play) may be defined as lost motion between engaging (e.g., meshing, mating, contacting, etc.) components of a drive train caused by slack and spaces (e.g., clearances, gaps, etc.) between such engaging components. Backlash of a drive train may be defined as a distance through which an input member (i.e., the first component) of the drive train can be moved in one direction without applying appreciable force or motion to an output member (i.e., the last component) of the drive train in a mechanical sequence. The distance may be physical distance of motion, including linear or rotational (i.e., angular) distance. The distance may also or instead be measured in terms of other parameters, including, for example, time, force, torque, or power. Each operative connection between engaging components of the drive train can have an individual backlash and the sum of the individual backlashes of the engaging components yields a total backlash of the drive train.

The present disclosure is directed to implementations of systems and/or methods for measuring backlash of a drive train of an equipment unit. The measured backlash may be received by a processing device and recorded. Backlash may be used as a basis for determining operational health of the drive train, such as to predict failures and/or to optimize maintenance of the equipment unit. Thus, systems and/or methods within the scope of the present disclosure may be further operable to measure, quantify, or otherwise determine operational health of the drive train based on the measured backlash. The backlash measurements may be compared to a predetermined backlash threshold quantity to determine the operational health of the drive train. Operational health may include physical condition, such as a level or progression of wear and/or degradation of the drive train. The systems and/or methods may be operable to measure backlash of a drive train based on sensor measurements indicative of one or more operational parameters of the drive train. For example, the backlash measurements may be based on rotational position measurements facilitated by a rotational position sensor located in association with the equipment unit. The backlash measurements may also or instead be based on, for example, linear position measurements, load measurements, and/or time measurements facilitated by corresponding sensors.

Some of the well construction equipment described above operate in a generally unidirectional manner. For example, the pump units 144 discharge drilling fluid while operating in one direction, the drawworks 118 increases and decreases tension of the support line 123 while operating in one direction, and the top drive 116 drills the wellbore 102 by rotating in one direction (i.e., clockwise). Although the top drive 116 may also rotate counterclockwise to perform certain operations (e.g., reaming, break out of connections, etc.), the total number of counterclockwise rotations pales in comparison to the total number of clockwise rotations performed to drill the wellbore 102. Because of such unidirectional operations, drive trains of unidirectional wellsite equipment experience loading and thus wear and/or degradation primarily on one side of their respective components (e.g., chain links, gear teeth, etc.). Accordingly, one or more aspects of the present disclosure pertain to a distinction made between a load side and a non-load side when measuring backlash of unidirectional well construction equipment. As a check on validity of backlash measurements used to determine operational health (e.g., progressive wear and/or degradation) of unidirectional well construction equipment, it is to be observed that a load side backlash will generally be larger than a non-load side backlash. Backlash measurements of both load and non-load sides of a drive train provides value, in that the load side backlash is generally larger than the non-load side backlash and that the non-load side backlash (and thus wear and/or degradation) generally increases slowly and progressively. The non-load backlash being larger than the load backlash may be indicative of an unusual operational health problem associated with a unidirectional equipment unit. It is also expected that, over a longer period of time, the load backlash and the non-load backlash will continue to diverge.

Figure 2:
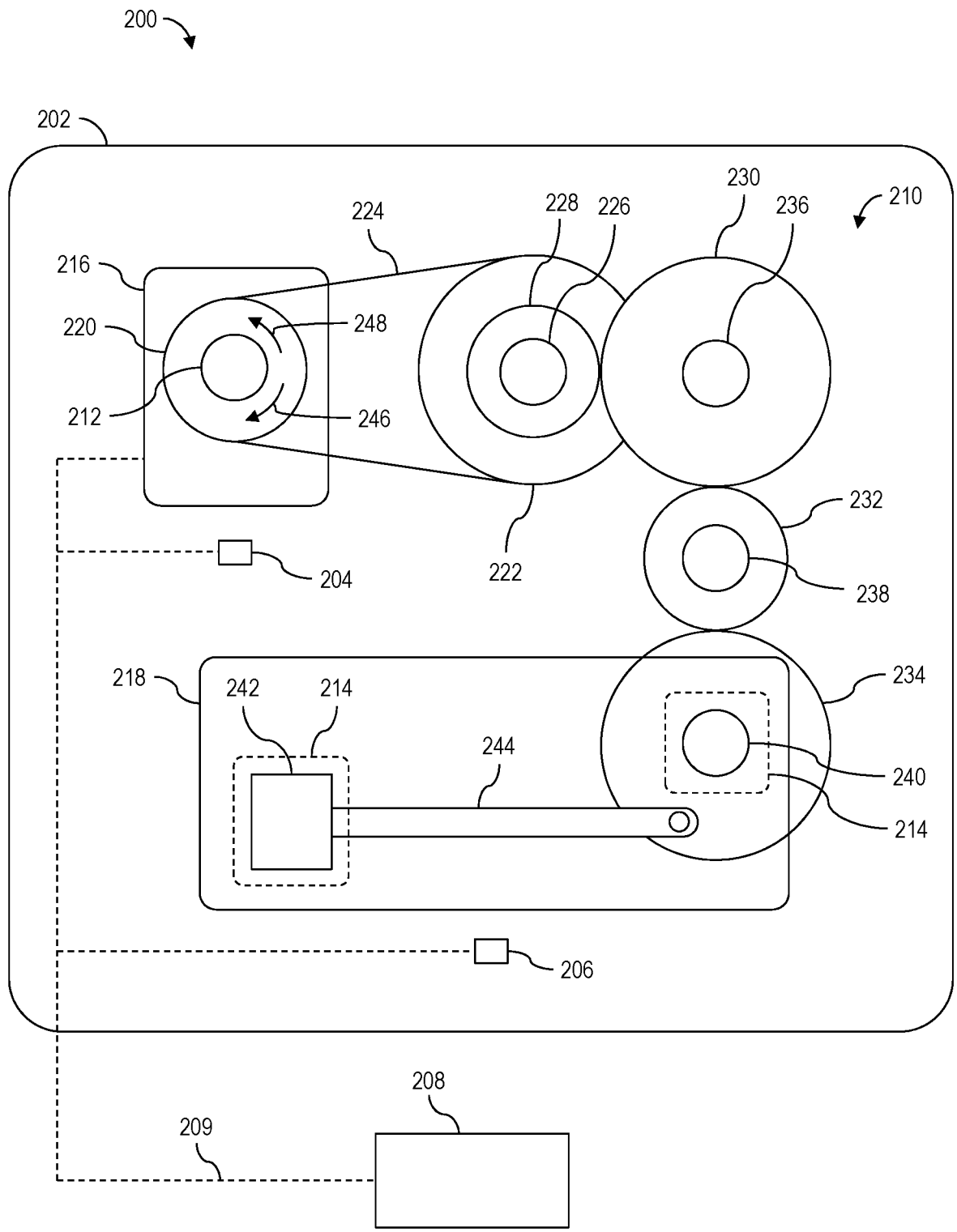
FIG. 2 is a schematic view of at least a portion of an example implementation of apparatus according to one or more aspects of the present disclosure.

FIG. 2 is a schematic view of at least a portion of an example implementation of a monitoring system 200 for measuring backlash of a drive train 210 and determining operational health of the drive train 210 based on the measured backlash. The monitoring system 200 may form a portion of or operate in conjunction with the well construction system 100 shown in FIG. 1. The drive train 210 may be or form a portion of an equipment unit 202 of the well construction system 100. For example, the drive train 210 may be or form a portion of one of the mud pump units 144, the top drive 116, the drawworks 118, the power tongs 165, the THM 160, the catwalk 161, or a shale shaker 172. Accordingly, the following description refers to FIGS. 1 and 2, collectively.

The drive train 210 may comprise an input member 212 and an output member 214 that are operatively (i.e., mechanically) connected via a plurality of intermediate components of the drive train 210 collectively operable to transfer mechanical power from the input member 212 to the output member 214. The input member 212 may be connected to an actuator 216 (e.g., an electric motor, a combustion engine, a hydraulic motor, etc.) of the equipment unit 202 operable to output mechanical power to the input member 212. The output member 214 may be connected to a work portion 218 of the equipment unit 202 operable to perform work (e.g., an action or a well construction operation). The input member 212 of the drive train 210 may be or comprise a rotatable input shaft connected to an output shaft (not shown) of the actuator 216. The intermediate components may include, for example, a pulley system comprising an input pulley 220 and an output pulley 222 operatively connected together via a flexible member 224 (e.g., a chain, a belt, etc.). The input pulley 220 may be fixedly connected to and supported by the input member 212. The output pulley 222 may be fixedly connected to and supported by an intermediate shaft 226. The intermediate components may further include, for example, a gear system comprising a pinion gear 228, a spur gear 230, an intermediate pinion gear 232, and an output gear 234. The gear system may be operatively connected between the output pulley 222 and the output member 214. For example, the output pulley 222 may be fixedly connected to the pinion gear 228 via the intermediate shaft 226. The pinion gear 228 may be engaged with (i.e., mesh, mate, contact, etc.) with the spur gear 230, the spur gear 230 may be engaged with the intermediate pinion gear 232, and the intermediate gear 232 may be engaged with the output gear 234. The spur gear 230, the intermediate pinion gear 232, and the output gear 234 may each be supported by a corresponding shaft 236, 238, 240.

If the work portion 218 rotates or otherwise utilizes rotational motion, the output member 214 may be or comprise the output shaft 240 operatively connecting the drive train 210, and thus the actuator 216, to the work portion 218. In such implementations, the drive train 210 may be operable to transfer rotational mechanical power (i.e., torque) from the actuator 216 to the work portion 218. A work portion 218 that rotates or otherwise utilizes rotational motion may be or comprise, for example, the drive shaft 125 of the top drive 116, the drum of the drawworks 118, and the torqueing portion 167 of the power tongs 165. However, if the work portion 218 moves linearly or otherwise utilizes linear motion, the output member 214 may be or comprise a linearly movable output member 242 operatively connecting the drive train 210, and thus the actuator 216, to the work portion 218. The linearly movable output member 242 may be operatively connected to the output gear 234 via a connecting member 244 (e.g., a rod). In such implementations, the drive train 210 may be operable to convert rotational mechanical power (i.e., torque) output by the actuator 216 to linear mechanical power (i.e., linear force) received by the work portion 218. A work portion 218 that moves linearly or otherwise utilizes linear motion may be or comprise, for example, a fluid piston or a crosshead of a mud pump unit 144, an arm 168 or clamp 169 of the THM 160, or a shaking screen of a shale shaker 172.

The input member 212 may undergo (i.e., receive or experience) an operational input (e.g., rotational motion) caused by the actuator 216, and the output member 214 may undergo an operational output (e.g., rotational or linear motion) when the operational input is transferred to or otherwise reaches the output member 214 via the intermediate components. The operational output may thus be a reaction at the output member 214 caused by the operational input. The operational input of the input member 212 may be measured, the operational output of the output member 214 may be measured, and a difference between the operational input measurements and the operational output measurements may be or comprise a backlash of the drive train 210. The operational input measurements and the operational output measurements may be or comprise measurements of predetermined operational parameters, such as rotational position and linear position, among other examples. However, the difference between the operational input measurements and the operational output measurements may not be limited to linear or rotational distance, but may comprise a change of other operational parameters caused by the operational input at the input member 212 and the output member 214.

The monitoring system 200 may comprise an input sensor 204 operable to measure the operational input and an output sensor 206 operable to measure the operational output. The input sensor 204 may be operable to generate input sensor data or otherwise facilitate operational input measurements indicative of operational parameters associated with or defining the operational input underwent by the input member 212. The output sensor 206 may be operable to generate output sensor data or otherwise facilitate operational output measurements indicative of operational parameters associated with or defining the operational output underwent by the output member 214. The input sensor 204 may be installed or otherwise disposed in association with the input member 212, such as may permit the input sensor 204 to measure the operational input. For example, the input sensor 204 may be disposed in association with the output shaft or another rotating member of the actuator 216. The output sensor 206 may be installed or otherwise disposed in association with the output member 214, such as may permit the output sensor 206 to measure the operational output. For example, the output sensor 206 may be disposed in association with the output shaft 240 if the output shaft 240 is the output member 214 of the drive train 210. The output sensor 206 may instead be disposed in association with the linearly movable output member 242 if the linearly movable output member 242 is the output member 214 of the drive train 210.

The input sensor 204 may be or comprise a rotational position sensor operable to facilitate operational input measurements indicative of rotational position, speed, and/or acceleration of the input member 212. The rotational position sensor may be or comprise, for example, a rotary encoder, a rotary potentiometer, a rotary variable-differential transformer, an optical rotational position sensor, or a video camera. The input sensor 204 may be or comprise a linear position sensor operable to facilitate operational input measurements indicative of linear position, speed, and/or acceleration of the input member 212. The linear position sensor may be or comprise, for example, a linear encoder, a linear potentiometer, a linear variable-differential transformer, an optical linear position sensor, or a video camera. The input sensor 204 may be or comprise a load sensor operable to facilitate operational input measurements indicative of a load transmitted by the input member 212 or that the input member 212 is submitted to, including, for example, pressure, force, torque, or mechanical power. The load sensor may be or comprise, for example, a pressure sensor, a load cell, a torque sensor (e.g., a torque sub), or an electrical power meter. The electrical power meter may be operable to measure electrical power consumed by the actuator 216, thereby indirectly measuring mechanical power output by the actuator 216 to the input member 212. The input sensor 204 may be or comprise a vibration sensor operable to facilitate operational input measurements indicative of amplitude and/or frequency of vibrations generated or experienced by the input member 212 or the drive train 210. The vibration sensor may be or comprise, for example, a linear position sensor, a force sensor, or an accelerometer. The input sensor 204 may be or comprise a sound sensor operable to facilitate operational input measurements indicative of amplitude and/or frequency of sound waves generated by or received at the input member 212 or the drive train 210. The sound sensor may be or comprise, for example, a microphone. The input sensor 204 may be or comprise a temperature sensor operable to facilitate operational input measurements indicative of temperature of the input member 212 or the drive train 210. The temperature sensor may be or comprise, for example, a thermometer or a thermocouple.

The output sensor 206 may be or comprise a rotational position sensor operable to facilitate operational output measurements indicative of rotational position, speed, and/or acceleration of the output member 214. The rotational position sensor may be or comprise, for example, a rotary encoder, a rotary potentiometer, a rotary variable-differential transformer, an optical rotational position sensor, or a video camera. The output sensor 206 may be or comprise a linear position sensor operable to facilitate operational output measurements indicative of linear position, speed, and/or acceleration of the output member 214. The linear position sensor may be or comprise, for example, a linear encoder, a linear potentiometer, a linear variable-differential transformer, an optical linear position sensor, or a video camera. The output sensor 206 may be or comprise a load sensor operable to facilitate operational output measurements indicative of a load transmitted by the output member 214 or that the output member 214 is submitted to, including, for example, pressure, force, torque, or mechanical power. The load sensor may be or comprise, for example, a pressure sensor, a load cell, or a torque sensor (e.g., a torque sub). The output sensor 206 may be or comprise a vibration sensor operable to facilitate operational output measurements indicative of amplitude and/or frequency of vibrations generated or experienced by the output member 214 or the drive train 210. The vibration sensor may be or comprise, for example, a linear position sensor, a force sensor, or an accelerometer. The output sensor 206 may be or comprise a sound sensor operable to facilitate operational output measurements indicative of amplitude and/or frequency of sound waves generated by or received at the output member 214 or the drive train 210. The sound sensor may be or comprise, for example, a microphone. The output sensor 206 may be or comprise a temperature sensor operable to facilitate operational output measurements indicative of temperature of the output member 214 or the drive train 210. The temperature sensor may be or comprise, for example, a thermometer or a thermocouple.

The monitoring system 200 may further comprise an equipment controller 208, such as a programmable logic controller (PLC), a computer (PC), an industrial computer (IPC), or another information processing device equipped with control logic, communicatively connected with the input sensor 204, the output sensor 206, and the actuator 216 of the equipment unit 202. The equipment controller 208 may be in real-time communication with the sensors 204, 206 and the actuator 216. The equipment controller 208 may be operable to monitor the input sensor 204 and the output sensor 206 and control the actuator 216. Communication between the equipment controller 208, the sensors 204, 206, and the actuator 216 may be via wired and/or wireless communication means 209. However, for clarity and ease of understanding, such communication means 209 are not wholly depicted, and a person having ordinary skill in the art will appreciate that such communication means are within the scope of the present disclosure. The equipment controller 208 may be or form at least a portion of the equipment controller 192.

The equipment controller 208 may be operable to perform or cause the performance of backlash measurement operations to measure backlash of the drive train 210. For example, the equipment controller 208 may cause the input member 212 to undergo (i.e., receive or experience) a first operational input by causing the actuator 216 to rotate the input member 212 in a first direction, as indicated by arrow 246, until the output member 214 undergoes a first operational output. Such operation "zeroes" the drive train 210 and the backlash measurement operations in the first direction 246 by ensuring that the components (i.e., the pulleys 220, 222, the flexible member 224, and the gears 228, 230, 232, 234) of the drive train 210 are physically engaged (i.e., in contact) and that slack and spaces (e.g., clearances, gaps, etc.) between the components of the drive train 210 are removed. The equipment controller 208 may then cause the input member 212 to undergo a second operational input by causing the actuator 216 to rotate the input member 212 in a second direction, as indicated by arrow 248, until the second operational input works its way through the slack and spaces of the drive train 210 and the output member 214 undergoes a second operational output. The equipment controller 208 may then cause the input member 212 to undergo a third operational input by causing the actuator 216 to rotate the input member 212 in the first direction 246, until the third operational input works its way through the slack and spaces of the drive train 210 and the output member 214 undergoes a third operational output. While the actuator 216 rotates the input member 212, the equipment controller 208 may receive and record the operational input measurements indicative of operational parameters associated with or defining the operational input underwent by the input member 212 facilitated by the input sensor 204 and the operational output measurements indicative of operational parameters associated with or defining the operational output underwent by the output member 214 facilitated by the output sensor 206.

The equipment controller 208 may then determine the backlash of the drive train 210 in the second direction 248 by determining (i.e., measuring) a difference (e.g., a distance) between the operational input measurements when the input member 212 underwent the second operational input and the operational input measurements when the output member 214 underwent the second operational output. The equipment controller 208 may then determine the backlash of the drive train 210 in the first direction 246 by determining a difference between the operational input measurements when the input member 212 underwent the third operational input and the operational input measurements when the output member 214 underwent the third operational output. Such backlash measurement operations may facilitate total (i.e., cumulative) backlash measurements of the drive train 210. The total backlash measurements may be indicative of operational health (i.e., physical condition, such as level or progression of wear and/or degradation) of the entire drive train 210.

The equipment controller 208 may also be operable to determine individual backlash of each pair of engaging (e.g., meshing, mating, contacting, etc.) components of the drive train 210, wherein the summation of the individual backlashes of the drive train 210 is or comprises the total backlash of the drive train 210. Individual backlash measurements may be indicative of operational health of each pair of engaging components of the drive train 210. Knowledge of operational health of specific components of the drive train 210 may permit rig personnel (e.g., maintenance personnel and/or maintenance planners) to repair or change individual components of the drive train 210, instead of repairing or changing the entire drive train 210. For example, the drive train 210 comprises two pulleys and four gears (i.e., six intermediate components), thereby comprising four engaging pairs of components, each having an individual backlash. Each individual backlash may be measured by the equipment controller 208 based on operational measurements facilitated by a corresponding sensor (not shown) dedicated for measuring each individual backlash. However, as further described below, each individual backlash may also or instead be measured by analyzing the input and output operational measurements, facilitated by the input and output sensors 204, 206, for signatures indicative of each individual backlash. Individual and total backlash measurements may be analogous to feeling engagement of inner components or mechanisms of a rotating combination lock. Detecting and measuring positioning and timing of engagements between the inner components can provide information indicative of their spacing (i.e., backlash) and the nature (e.g., distance) of such spacing.

The monitoring system 200 may be operable to measure backlash in terms of a rotational position of the input member 212 and a rotational position of a output member 214 (i.e., the output shaft 240), in terms of a rotational position of the input member 212 and a linear position of the output member 214 (i.e., the linearly movable output member 242), and in terms of load transmitted by the rotational input member 212. The monitoring system 200 may also or instead be operable to measure backlash in terms of time span between predetermined position and load measurements. Position measurements may include rotational position measurements of a motor output shaft of a mud pump unit 144, the top drive 116, and/or the drawworks 118. Position measurements may further include rotational position measurements of a crankshaft of a mud pump unit 144, the drive shaft 125 of the top drive 116, and/or the drum of the drawworks 118. Position measurements may also include linear position measurements of a piston or crosshead of a mud pump unit 144. Load measurements may include torque measurements of a motor output shaft of a mud pump unit 144, the top drive 116, and/or the drawworks 118. Load measurements may further include torque measurements of a crankshaft of a mud pump unit 144, the drive shaft 125 of the top drive 116, and/or the drum of the drawworks 118. Load measurements may also include fluid pressure of a mud pump unit 144 and hookload of the drawworks 118.

The monitoring system 200 may be further operable to measure or otherwise determine backlash of the drive train 210 in terms of other operational parameters associated with the input member 212, the output member 214, and/or another portion of the drive train 210. Thus, for a sensor 204, 206 operable to facilitate operational measurements indicative of an amplitude (i.e., level) of an operational parameter associated with the drive train 210, the equipment controller 208 may be operable to determine the backlash of the drive train 210 by determining a difference between the operational measurements when the input member 212 starts to move and the operational measurements when the output member 214 starts to move. The equipment controller 208 may then determine that the drive train 210 is worn when the backlash of the drive train 210 is equal to or larger than a predetermined threshold backlash.

For example, when at least one of the sensors 204, 206 is implemented as a vibration sensor operable to facilitate vibration measurements indicative of amplitude of vibrations of the input member 212, the output member 214, and/or another portion of the drive train 210, the equipment controller 208 may be operable to determine a backlash vibration of the drive train 210 by determining a difference between the operational measurements (i.e., amplitude of vibrations) when the input member 212 starts to move and the operational measurements when the output member 214 starts to move. When at least one of the sensors 204, 206 is implemented as a temperature sensor operable to facilitate temperature measurements indicative of temperature of the input member 212, the output member 214, and/or another portion of the drive train 210, the equipment controller 208 may be operable to determine a backlash temperature of the drive train 210 by determining a difference between the operational measurements (i.e., temperature) when the input member 212 starts to move and the operational measurements when the output member 214 starts to move. When at least one of the sensors 204, 206 is implemented as a sound sensor operable to facilitate sound measurements indicative of amplitude (i.e., volume) of sound of the input member 212, the output member 214, and/or another portion of the drive train 210, the equipment controller 208 may be operable to determine a backlash sound of the drive train 210 by determining a difference between the operational measurements (i.e., amplitude of sound) when the input member 212 starts to move and the operational measurements when the output member 214 starts to move.

The present disclosure is further directed to example methods (e.g., steps, operations, processes, etc.) of performing operational health monitoring of a drive train of an equipment unit via a monitoring system according to one or more aspects of the present disclosure. The operational health monitoring may include example methods of performing backlash measurement operations. The example methods may be performed utilizing or otherwise in conjunction with at least a portion of one or more implementations of one or more instances of the apparatus shown in one or more of FIGS. 1 and 2, and/or otherwise within the scope of the present disclosure. For example, the methods may be at least partially performed and/or caused by an equipment controller executing program code instructions according to one or more aspects of the present disclosure. The methods may also or instead be at least partially performed and/or caused by a human operator (i.e., rig personnel) utilizing one or more instances of the apparatus shown in one or more of FIGS. 1 and 2 and/or otherwise within the scope of the present disclosure. Thus, the following description of example methods refers to apparatus shown in one or more of FIGS. 1 and 2. However, the methods may also be performed in conjunction with implementations of apparatus other than those depicted in FIGS. 1 and 2 that are also within the scope of the present disclosure.

Figure 3:
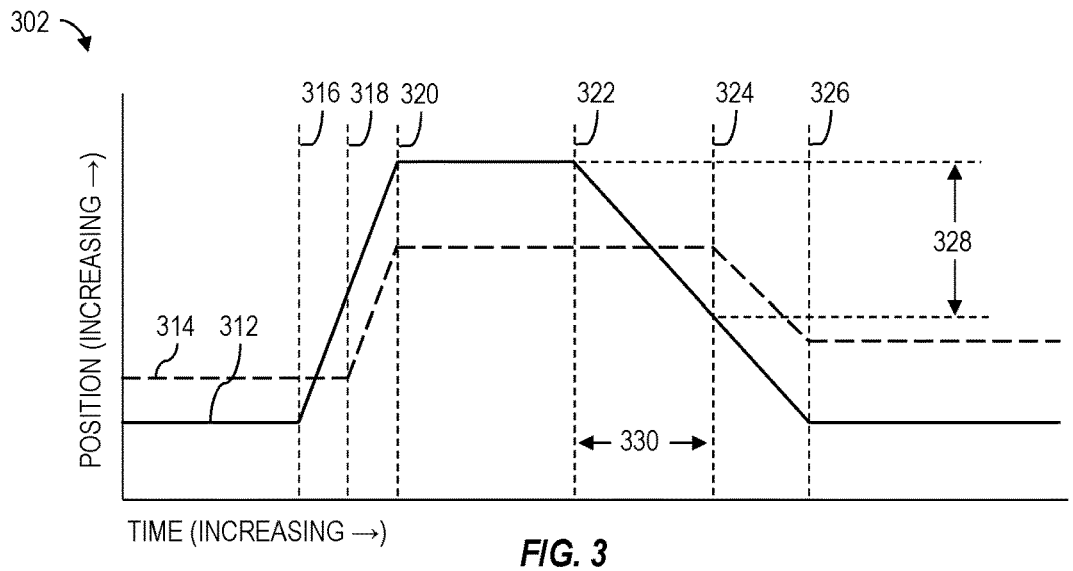
FIGS. 3-6 are graphs according to one or more aspects of the present disclosure.

FIG. 3 is a graph 302 showing example input operational measurements 312 of the input member 212 and example output operational measurements 314 of the output member 214 of the drive train 210 shown in FIG. 2 recorded during example backlash measurement operations. The input operational measurements 312 may be facilitated by the input sensor 204 disposed in associated with the input member 212 and the output operational measurements may be facilitated by the output sensor 206 disposed in associated with the output member 214. The input operational measurements 312 are indicative of rotational position of the input member 212. The output operational measurements 314 are indicative of rotational position of the output member 214 when the output member 214 is implemented as the output shaft 240, or linear position of the output member 214 when the output member 214 is implemented as the linearly movable output member 242. The input operational measurements 312 and the output operational measurements 314 are shown with respect to time. The following description refers to FIGS. 2 and 3, collectively.

The backlash measurement operations may be performed or caused to be performed by the equipment controller 208 to determine a total (i.e., cumulative) backlash of the drive train 210 based on the input and output operational measurements 312, 314. For example, the equipment controller 208 may cause the input member 212 to undergo (i.e., receive or experience) a first operational input by causing the actuator 216 to rotate the input member 212 in the first direction 246 at time 316 until the output member 214 undergoes a first operational output (i.e., starts to rotate or linearly move in a first direction) at time 318. Such operation "zeroes" the drive train 210 and the backlash measurement operations in the first direction 246. The equipment controller 208 may then cause the actuator 216 to stop rotating the input member 212 at time 320, thereby also stopping the first operational output of the output member 214. The equipment controller 208 may then cause the input member 212 to undergo a second operational input by causing the actuator 216 to rotate the input member 212 in the second direction 248 at time 322 until the operational input works its way through the slack and spaces of the drive train 210 and the output member 214 undergoes a second operational output (i.e., starts to rotate or linearly move in a second direction) at time 324. The equipment controller 208 may then cause the actuator 216 to stop rotating the input member 212 at time 326, thereby also stopping the second operational output of the output member 214. While the actuator 216 rotates the input member 212, the equipment controller 208 may receive and record the operational input measurements 312 and the operational output measurements 314.

The equipment controller 208 may then determine a backlash 328 of the entire drive train 210 in the second direction 248 in terms of distance (referred to hereinafter as a "total backlash distance 328") by determining (i.e., measuring) a difference (i.e., a distance) between a position of the input member 212 at time 322, when the input member 212 underwent the second operational input, and a position of the input member 212 at time 324, when the output member 214 underwent the second operational output. The total backlash distance 328 may thus be a rotational distance that the input member 212 is rotated before the output member 214 starts to move.

The equipment controller 208 may also or instead determine a backlash 330 of the entire drive train 210 in the second direction in terms of time (referred to hereinafter as a "total backlash time 330") by determining a difference (i.e., a time span or period) between time 322, when the input member 212 underwent the second operational input, and time 324, when the output member 214 underwent the second operational output. The total backlash time 330 may thus be a measurement of time it took from start of operational input to start of operational output. If backlash measurement operations are performed with the input member 212 being moved at a constant speed, then measuring total backlash time can be consistent and useful in determining operational health of the drive train 210. For example, a progressive increase in total backlash time may be indicative of a progressive increase in wear and/or degradation of the drive train 210.

Figure 4:
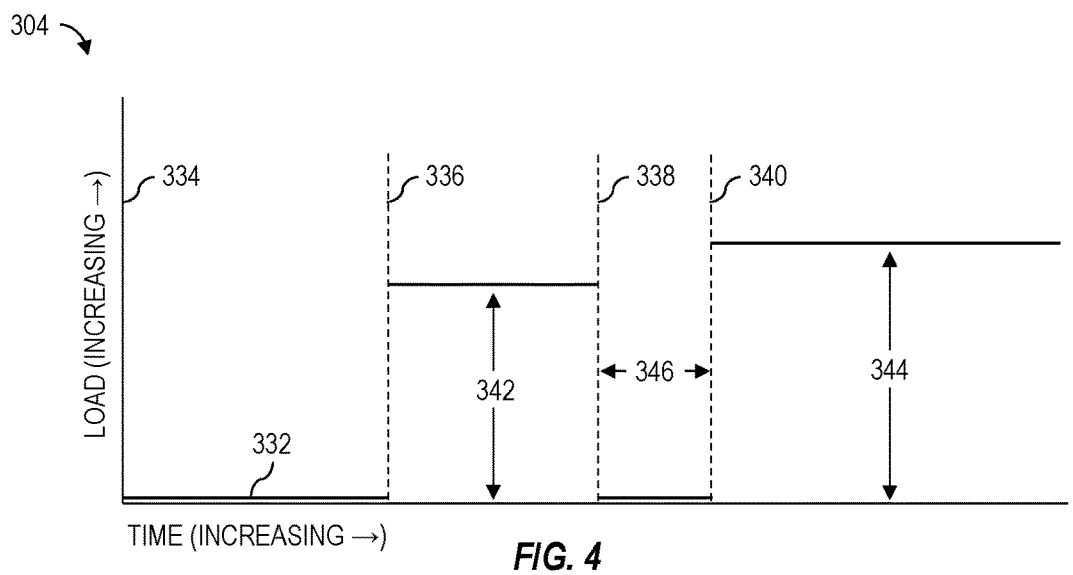

FIG. 4 is a graph 304 showing example input load measurements 332 indicative of load submitted to (e.g., received or experienced) or transmitted by the input member 212 of the drive train 210 shown in FIG. 2 recorded during example backlash measurement operations. The input load measurements 332 may be facilitated by the input sensor 204 configured to measure load (e.g., force, torque, mechanical power, etc.) submitted to or transmitted by the input member 212. The input load measurements 332 are shown with respect to time. The following description refers to FIGS. 2 and 4, collectively.

The backlash measurement operations may be performed or caused to be performed by the equipment controller 208 to determine a total backlash of the drive train 210 based on the input load measurements 332. For example, the equipment controller 208 may cause the input member 212 to undergo a first operational input by causing the actuator 216 to rotate the input member 212 of the drive train 210 in the first direction 246 at time 334. While the input member 212 starts to rotate in the first direction, the input load measurements 332 indicate a low load or no load. The input member 212 may continue to be rotated in the first direction 246 until the output member 214 undergoes a first operational output (i.e., starts to rotate or linearly move in a first direction) at time 336. Such operation "zeroes" the drive train 210 and the backlash measurement operations in the first direction 246. The equipment controller 208 may then cause the input member 212 to undergo a second operational input by causing the actuator 216 to rotate the input member 212 in the second direction 248 at time 338. While input member 212 starts to rotate in the second direction 248, the input load measurements 332 indicate a low load or no load. The input member 212 may continue to be rotated in the second direction 248 until the operational input works its way through the slack and spaces of the drive train 210 and the output member 214 undergoes a second operational output (i.e., starts to rotate or linearly move in a second direction) at time 340. While the actuator 216 rotates the input member 212, the equipment controller 208 may receive and record the input load measurements 332.

The equipment controller 208 may then determine a backlash 342 of the entire drive train 210 in the first direction 246 in terms of load (hereinafter referred to as a "total backlash load 342") by determining (i.e., measuring) a difference between the input load measurements 332 at time 334, when the input member 212 underwent the first operational input, and the input load measurements 332 at time 336, when the output member 214 underwent the first operational output. The equipment controller 208 may also determine a backlash 344 of the entire drive train 210 in the second direction in terms of load (hereinafter referred to as a "total backlash load 344") by determining a difference between the input load measurements 332 at time 338, when the input member 212 underwent the second operational input, and the input load measurements 332 at time 340, when the output member 214 underwent the second operational output. Thus, the total backlash loads 342, 344 may be the loads that the input member 212 is submitted to before the output member 214 also starts to move. Total backlash loads 342, 344 may be used to measure or otherwise determine operational health of the drive train 210. A larger total backlash load 342, 344 in one direction (e.g., the total backlash load 344) may be indicative of more wear and/or degradation of the drive train 210 in that direction than in the opposing direction (e.g., the total backlash load 342). Furthermore, a progressive increase in total backlash load 342, 344 may be indicative of a progressive increase in wear and/or degradation of the drive train 210.

The equipment controller 208 may also or instead determine a backlash 346 of the entire drive train 210 in the second direction 248 in terms of time (hereinafter referred to as a "total backlash time 346") by determining a difference (i.e., a time period) between time 338, when the input member 212 underwent the second operational input, and time 340, when the output member 214 underwent the second operational output. Thus, the total backlash time 346 may be a measurement of time it took from start of the operational input to start of the operational output. As described above, total backlash time 346 may be used to measure or otherwise determine operational health of the drive train 210.

Although graph 304 shows the input operational measurements 332 in terms of load, it is to be noted that backlash measurements of the drive train 210 may be based on measurements of different operational parameters. For example, operational input measurements may be indicative of amplitude of vibrations, amplitude of sound, or temperature. Changes in such operational input measurements when the output member 214 of the drive train 210 undergoes the operational output may then be used to determine total backlash measurements, as described above. The total backlash measurements may then be used to measure or otherwise determine operational health of the drive train 210. For example, a progressive increase in total backlash measurements (in terms of the different operational parameters) may be indicative of a progressive increase in wear and/or degradation of the drive train 210. Also, larger total backlash measurements in one direction may be indicative of more wear and/or degradation of the drive train 210 in that direction than in the opposing direction.

Figure 5:
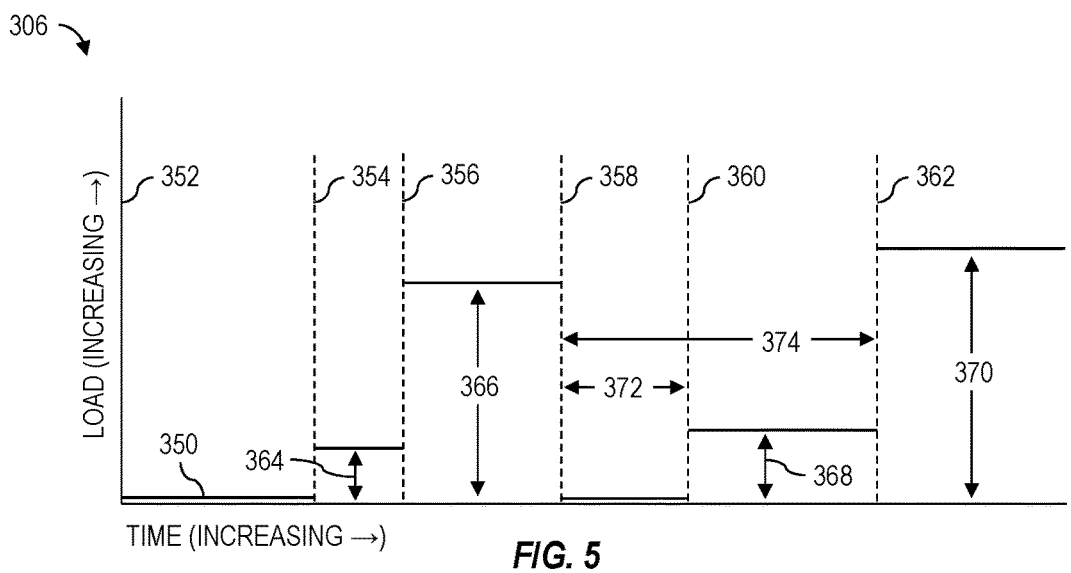

FIG. 5 is a graph 306 showing example input load measurements 350 indicative of load submitted to or transmitted by the input member 212 of the drive train 210 shown in FIG. 2 recorded during example backlash measurement operations. The input load measurements 350 may be facilitated by the input sensor 204 configured to measure load submitted to or transmitted by the input member 212. The input load measurements 350 are shown with respect to time. The following description refers to FIGS. 2 and 5, collectively.

The backlash measurement operations may be performed or caused to be performed by the equipment controller 208 to determine individual (i.e., incremental) backlashes and a total (i.e., cumulative) backlash of the drive train 210 based on the input load measurements 350. For example, the equipment controller 208 may cause the input member 212 to undergo a first operational input by causing the actuator 216 to rotate the input member 212 of the drive train 210 in the first direction 246 at time 352. While input member 212 is being rotated in the first direction 246, the input load measurements 350 indicate a low load or no load. The input member 212 may continue to be rotated in the first direction 246 until the input load measurements 350 increase, corresponding to engagement (i.e., elimination of slack and/or spaces) of a first pair of engaging (e.g., meshing, mating, contacting, etc.) components (i.e., the pulleys 220, 222) of the drive train 210 at time 354. The input member 212 may continue to be rotated in the first direction 246 until the input load measurements 350 increase further (not shown), corresponding to engagement of a second pair of engaging components (i.e., the gears 228, 230) of the drive train 210. The input member 212 may continue to be rotated in the first direction 246 while the input load measurements 350 increase further (not shown) with engagement of each additional pair of engaging components (i.e., the pair of gears 230, 232 and the pair of gears 232, 234) of the drive train 210. The input member 212 may continue to be rotated in the first direction 246 until the output member 214 undergoes a first operational output (e.g., starts to rotate or linearly move in a first direction) at time 356. Such operation "zeroes" the drive train 210 and the backlash measurement operations in the first direction 246. The equipment controller 208 may then cause the input member 212 to undergo a second operational input by causing the actuator 216 to rotate the input member 212 in the second direction 248 at time 358. While input member 212 is being rotated in the second direction, the input load measurements 350 indicate a low load or no load. The input member 212 may continue to be rotated in the second direction until the input load measurements 350 increase, corresponding to engagement of the first pair of engaging components of the drive train 210 at time 360. The input member 212 may continue to be rotated in the second direction 248 until the input load measurements 350 increase further (not shown), corresponding to engagement of the second pair of engaging components of the drive train 210. The input member 212 may continue to be rotated in the second direction 248 while the input load measurements 350 increase further (not shown) with engagement of each additional pair of engaging components of the drive train 210. The input member 212 may continue to be rotated in the second direction 248 until the output member 214 undergoes a second operational output (e.g., starts to rotate or linearly move in a second direction) at time 362.

While the actuator 216 rotates the input member 212, the equipment controller 208 may receive and record the input load measurements 350. The equipment controller 208 may determine individual backlashes and the total backlash of the drive train 210 in the first and second directions 246, 248 in terms of load. The equipment controller 208 may determine an individual backlash load 364 of the first pair of engaging components of the drive train 210 in the first direction 246 by determining (i.e., measuring) the increase in the input load measurements 350 when the first pair of engaging components of the drive train 210 engaged while the input member 212 was rotated in the first direction 246. For example, the equipment controller 208 may determine the individual backlash load 364 of the first pair of engaging components of the drive train 210 in the first direction 246 by determining a difference between the input load measurements 350 at time 352, when the input member 212 underwent the first operational input, and the input load measurements 350 at time 354, which increased when the first pair of engaging components of the drive train 210 engaged. The equipment controller 208 may also determine an individual backlash load of each remaining pair of engaging components of the drive train 210 in the first direction 246 by measuring each subsequent increase in the input load measurements 350 when each subsequent pair of engaging components of the drive train 210 engaged. The equipment controller 208 may then determine the total backlash load 366 of the drive train 210 in the first direction 246 by determining a difference between the input load measurements 350 at time 352, when the input member 212 underwent the first operational input, and the input load measurements 350 at time 356, when the output member 214 underwent the first operational output.

The equipment controller 208 may also determine an individual backlash load 368 of the first pair of engaging components of the drive train 210 in the second direction 248 by determining the increase in the input load measurements 350 when the first pair of engaging components of the drive train 210 engaged while the input member 212 was rotated in the second direction 248. For example, the equipment controller 208 may determine the individual backlash load 368 of the first pair of engaging components of the drive train 210 in the second direction 248 by determining a difference between the input load measurements 350 at time 358, when the input member 212 underwent the second operational input, and the input load measurements 350 at time 360, which increased when the first pair of engaging components of the drive train 210 engaged. The equipment controller 208 may also determine an individual backlash load of each remaining pair of engaging components of the drive train 210 in the second direction 248 by measuring each subsequent increase in the input load measurements 350 when each subsequent pair of engaging components of the drive train 210 engaged. The equipment controller 208 may then determine the total backlash load 370 of the drive train 210 in the second direction 248 by determining a difference between the input load measurements 350 at time 358, when the input member 212 underwent the second operational input, and the input load measurements 350 at time 362, when the output member 214 underwent the second operational output.

The equipment controller 208 may also or instead determine individual backlashes and a total backlash of the drive train 210 in terms of time. The equipment controller 208 may determine an individual backlash time 372 of the first pair of engaging components of the drive train 210 in the second direction 248 by determining (i.e., measuring) the amount of time it took for the first pair of engaging components of the drive train 210 to engage while the input member 212 was rotated in the second direction 248. For example, the equipment controller 208 may determine the individual backlash time 372 of the first pair of engaging components of the drive train 210 in the second direction 248 by determining a difference (i.e., a time period) between time 358, when the input member 212 underwent the second operational input, and time 360, when the first pair of engaging components of the drive train 210 engaged. The equipment controller 208 may also determine an individual backlash time for each remaining pair of engaging components of the drive train 210 in the second direction 248 by measuring each subsequent amount of time it took for each subsequent pair of engaging components of the drive train 210 to engage. Thus, the equipment controller 208 may determine the individual backlash time for each remaining pair of engaging components of the drive train 210 in the second direction by measuring the amount of time between engagement of each remaining pair of engaging components. The equipment controller 208 may then determine the total backlash time 374 of the drive train 210 in the second direction 248 by determining a difference between time 358, when the input member 212 underwent the second operational input, and time 362, when the output member 214 underwent the second operational output.

As described above, the backlash load measurements 364, 366, 368, 370 and backlash time measurements 372, 374 may be used to measure or otherwise determine operational health of the drive train 210. Total backlash measurements 366, 370, 374 may be indicative of operational health (i.e., physical condition, such as level or progression of wear and/or degradation) of the entire drive train 210. Individual backlash measurements 364, 368, 372 may be indicative of operational health of each pair of engaging components of the drive train 210. Knowledge of operational health of the individual pairs of engaging components of the drive train 210 may permit rig personnel (e.g., maintenance personnel and/or maintenance planners) to repair or change individual components of the drive train 210, instead of the entire drive train 210.

As described above, backlash measurement operations according to one or more aspects of the present disclosure may be performed for an equipment unit comprising a drive train. For example, a monitoring system according to one or more aspects of the present disclosure may be operable to perform backlash measurement operations to measure backlash of a drive train of a drawworks, a top drive, and a mud pump unit. To measure backlash of a drive train of a drawworks, the monitoring system and/or rig personnel may cause the drawworks to stop operating and cause a parking brake of the drawworks to engage to prevent or inhibit rotation of a drum of the drawworks. Rig personnel may then enter backlash data collection submenu of the monitoring system to initiate the backlash measurement operations of the drawworks. The monitoring system may then cause a motor of the drawworks to rotate in a first direction to "zero" the drive train in the first direction, pause the rotation, rotate in a second direction, pause the rotation, and then again rotate in the first direction, while recording the backlash measurements. One set of backlash measurements performed in a predetermined direction may be designated as "load side" backlash measurements and one set of backlash measurements performed in an opposing direction may be designated as "non-load side" backlash measurements. The "load side" backlash measurements and the "non-load side" backlash measurements may then be compared. The larger of the two backlash measurements, which are typically associated with the "load side," may be used as a basis for determining operational health of the drive train. Such methodology may change depending on whether the drawworks is a single-motor or multi-motor drawworks. For example, some dual-motor drawworks include both motors connected to a single, dual sided input shaft. Other dual-motor drawworks include each motor having its own individual input shaft and drive train. When measuring backlash of such drawworks, backlash measurements for both the load and non-load sides may be collected independently for each motor. It is noted that in order to collect backlash measurements, the drum of the drawworks may be locked (e.g., drum brake applied) because during directional changes (i.e., hoisting and lowering) of normal drawworks operation, the same gear teeth remain in continuous contact.

To measure backlash of a drive train of a top drive, the monitoring system and/or rig personnel may cause the top drive to stop operating and cause a parking brake of the top drive to engage to prevent or inhibit rotation of a drive shaft or quill of the top drive. Rig personnel may then enter a backlash data collection submenu of the monitoring system to initiate the backlash measurement operations of the top drive. The monitoring system may cause a motor of the top drive to rotate in a first direction to "zero" the drive train in the first direction, pause the rotation, rotate in a second direction, pause the rotation, and then again rotate in the first direction, while recording the backlash measurements. One set of backlash measurements performed in a predetermined direction may be designated as "load side" backlash measurements and one set of backlash measurements performed in an opposing direction may be designated as "non-load side" backlash measurements. The "load side" backlash measurements and the "non-load side" backlash measurements may then be compared. The larger of the two backlash measurements, which are typically associated with the "load side," may be used as a basis for determining operational health of the drive train. When measuring backlash of a multi-motor top drive, the backlash measurement operations may be performed for each motor and associated drive train. It is noted that in order to collect backlash measurements, the drive shaft of the top drive does not have to be locked (e.g., the drive shaft brake applied), because the top drive in operation can operate bi-directionally and be disconnected from the load it is driving.

To measure backlash of a drive train of a mud pump unit, the monitoring system and/or rig personnel may cause the mud pump unit to stop operating and cause a mechanical lock or brake of the mud pump unit to engage the crankshaft to prevent or inhibit rotation of the crankshaft. Rig personnel may then enter a backlash data collection submenu of the monitoring system 200 to initiate the backlash measurement operations. The monitoring system 200 may cause a motor of the mud pump unit to rotate in a first direction to "zero" the drive train in the first direction, pause the rotation, rotate in a second direction, pause the rotation, and then again rotate in the first direction, while recording backlash measurements. One set of the backlash measurements performed in a predetermined direction may be designated as "load side" backlash measurements and one set of backlash measurements performed in an opposing direction may be designated as "non-load side" backlash measurements. The "load side" backlash measurements and the "non-load side" backlash measurements may then be compared. The larger of the two backlash measurements, which are typically associated with the "load side," may be used as a basis for determining operational health of the drive train. When measuring backlash of a multi-motor mud pump unit, the backlash measurement operations may be performed independently for each motor and associated drive train. It is noted that a mud pump unit is different than a top drive or a drawworks, in that a mud pump unit does not have a mechanical brake that can be used to lock rotation of a crankshaft of the mud pump unit. Thus, a manually or remotely operated mechanical lock or brake may be installed on the mud pump unit to lock the crankshaft in position with respect to a housing of the mud pump unit.

The monitoring system 200 may be or form a portion of a prognosis and health management (PHM) system of the well construction system 100. A processing device (e.g., the equipment controller 208) of the PHM system may be operable to determine (e.g., calculate, derive, etc.) a health index (HI) for an equipment unit at least partially based on backlash measurements determined by the monitoring system 200. The HI may be indicative of operational health (i.e., wear and/or degradation) of the equipment unit, including of a drive train of the equipment unit. The HI may be continuously updated and monitored by the PHM system.

The monitoring system 200 may be further operable to calculate wear and/or degradation rates based on the backlash measurements. The monitoring system 200 may be operable to track changes in the backlash measurements over time and predict (i.e., anticipate) time when certain backlash thresholds will be exceeded, such as to predict operational health (e.g., remaining useful life) of an equipment unit. Anticipated time may refer to a point in time (e.g., a date) or an amount of operational activity performed by the equipment unit. The monitoring system 200 may be operable to output notification and/or alarms when certain backlash thresholds are met.

The monitoring system 200 may be further operable to relate progression of wear and/or deterioration with respect to operational parameters. For example, the monitoring system 200 may record operational parameters (e.g., load, speed, temperature, duty-cycle, etc.) of the wellsite equipment and correlate the determined wear and/or deterioration with the operational parameters. The monitoring system 200 may use the wear and/or deterioration patters associated with specific usage (e.g., operational parameters) to fine-tune the prediction of when the backlash thresholds will be exceeded.

The monitoring system 200 may be further operable to trigger action items related to operational health of the equipment, such as maintenance or replacement. For example, when a backlash threshold has been exceeded, the monitoring system 200 may notify rig personnel, shut down the equipment, and/or permit the equipment to run on diminished capabilities and/or performance. The monitoring system 200 may be further operable to update a health state of an equipment unit, such as by re-setting a backlash threshold or otherwise identify maintenance being performed. Deterioration (i.e., increase) of backlash measurements can be defined as a deviation from backlash measurements that are established to be a healthy baseline. Such deviation can be positive or negative, depending on the physics of the wear and/or deterioration. Individual backlash measurements for selected equipment may be aggregated to determine aggregate (i.e., total) backlash measurements.

Figure 6:
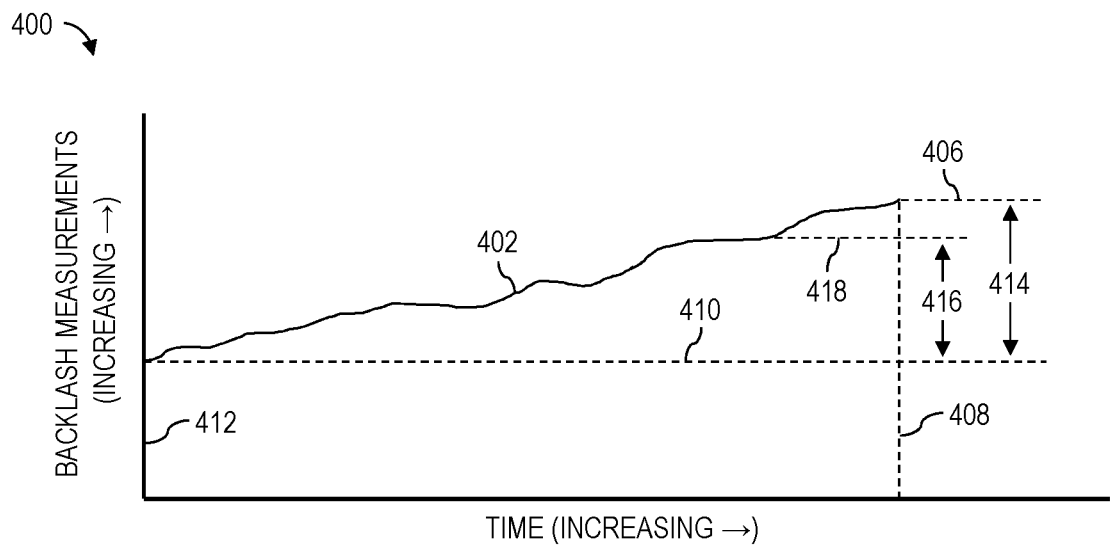

FIG. 6 is a graph 400 showing example backlash measurements 402 of a drive train of an equipment unit. The backlash measurements 402 are shown plotted along the vertical axis, with respect to time, which is shown plotted along the horizontal axis. The backlash measurements 402 may be or comprise individual or total backlash measurements of the drive train. The backlash measurements 402 may be or comprise, for example, backlash distance measurements, backlash load measurements, or backlash time measurements of the drive train.

A processing device (e.g., the equipment controller 208) may periodically compare currently (or most recently) received and/or recorded backlash measurements 402 to one or more previously recorded backlash measurements 402. For example, current backlash measurements 406 received and/or recorded by the processing device at a current (or most recent) time 408 may be compared to one or more previously recorded backlash measurements 402, such as baseline backlash measurements 410 (i.e., expected backlash measurements) that were set or recorded by the processing device at time 412. For example, the baseline backlash measurements 410 may have been recorded at time 412 when the drive train was new or just repaired. Therefore, the baseline backlash measurements 410 may comprise backlash measurements associated with a fully or otherwise optimally functional drive train. The processing device may then compare the current backlash measurements 406 to the baseline backlash measurements 410 to determine a difference 414 between the current backlash measurements 406 and the baseline backlash measurements 410. The determined difference 414 may be recorded to a database by the processing device. The processing device may then determine operational health of the drive train based on the determined difference 414.

For example, if the current backlash measurements 406 and the baseline backlash measurements 410 are substantially similar or match each other, then the drive train may be deemed or otherwise determined as being operationally healthy. However, if the current backlash measurements 406 and the baseline backlash measurements 410 are appreciably different, not substantially similar, or otherwise do not substantially match, then the drive train may be deemed or otherwise determined as being operationally unhealthy (e.g., degraded, worn, leaking, loose, inefficient, etc.). The drive train may also or instead be deemed or otherwise determined as being operationally unhealthy, for example, when the difference 414 (e.g., in profile and/or magnitude) between the current backlash measurements 406 and the baseline backlash measurements 410 is equal to or larger than a difference 416 between the baseline backlash measurements 410 and a predetermined threshold backlash 418. If the drive train was deemed or otherwise determined as being operationally unhealthy, such drive train may then be replaced or repaired.

The backlash measurement operations according to one or more aspects of the present application may be performed as standalone or specific operations dedicated solely to measure backlash. For example, backlash measurement operations may be performed between stages of well construction operations or when the well construction operations are not being performed. Backlash measurement operations may be performed at pre-determined intervals (e.g., each day, each week, each time the equipment is started, etc.) or per schedule (e.g., when the equipment accumulates a given number of running hours, running parameters, number of cycles, etc.). Backlash measurement operations may also or instead be performed during well construction operations that lend themselves to measure backlash. For example, backlash measurement operations may be performed when a piece of wellsite equipment naturally, because of its intended operation, changes direction of operation from a first direction to a second direction. Backlash measurement operations may be performed when a piece of wellsite equipment naturally, because of its intended operation, moves in a first direction and then in a second direction to measure backlash, before the first direction is resumed to continue its intended operation.

Backlash measurement operations may be performed differently depending on the intended accuracy, available time, and/or available resources. For example, actuation of a drive train in first and second directions may be performed at different speeds that permit capturing backlash measurements given sensitivity of input and output sensors and reporting rate of input and output sensors. Backlash measurement operations may be performed at different points of duty cycle of the well construction equipment that can favor or otherwise permit backlash measurement operations. For example, backlash measurement operations may be performed when the equipment is warm and the lubricating oil has reached an intended level of temperature and distribution, or when the equipment is cold and the lubricating oil is not present on engaged components of the drive train, thereby permitting direct contact between such components. Backlash measurement operations may be performed differently based on lifecycle stage of the equipment. For example, the backlash measurement operations may be performed when the equipment in new, such as during a quality check of manufacturing operations, and/or when performing a functional check, such as during commissioning operations. The backlash measurement operations may be performed before, during, or after maintenance operations, when equipment arrives at or departs a wellsite location, when equipment undergoes troubleshooting, and/or when equipment is evaluated for obsolescence.

As described above and shown in FIGS. 1-6, systems (e.g., the monitoring system 200) and methods (e.g., the backlash measurement operations) according to one or more aspects of the present disclosure may be utilized or otherwise implemented in association with a well construction system (e.g., the well construction system 100) at an oil and gas wellsite, such as for constructing a wellbore to obtain hydrocarbons (e.g., oil and/or gas) from a subterranean formation. However, the systems and methods of the present disclosure may be utilized or otherwise implemented in association with other automated systems in the oil and gas industry and other industries. For example, the systems and methods of the present disclosure may be implemented in association with wellsite systems for performing fracturing, cementing, acidizing, chemical injecting, and/or water jet cutting operations, among other examples. The systems and methods of the present disclosure may also be implemented in association with mining sites, building construction sites, and/or other work sites where automated machines or equipment are utilized.

Figure 7:
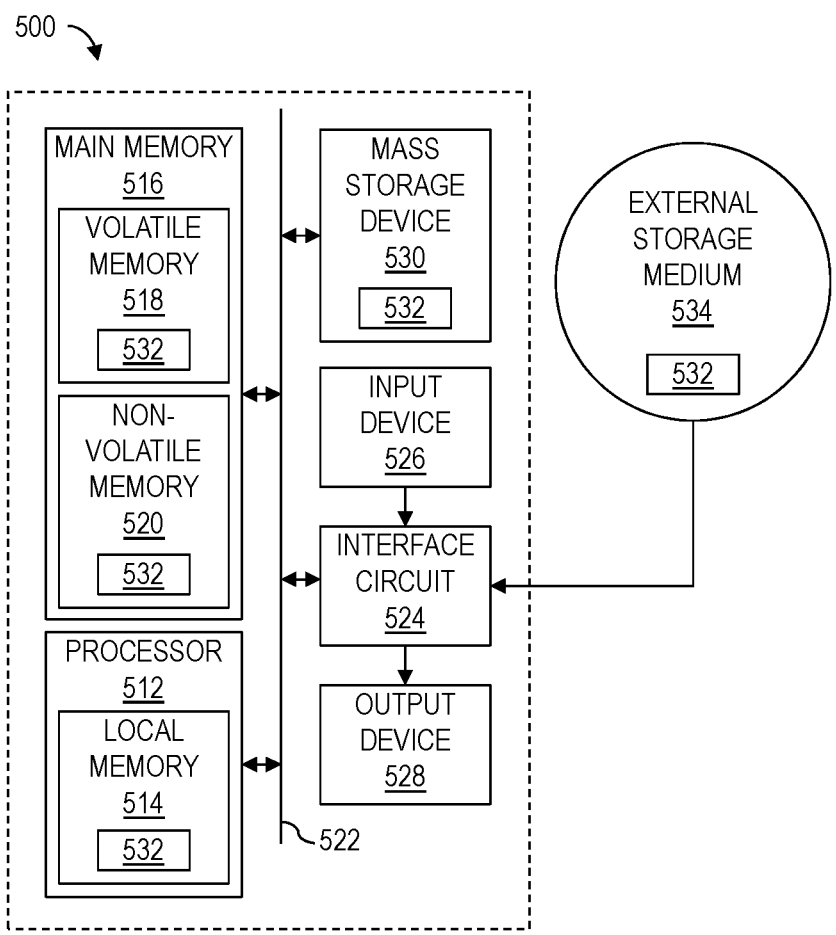
FIG. 7 is a schematic view of at least a portion of an example implementation of apparatus according to one or more aspects of the present disclosure.

FIG. 7 is a schematic view of at least a portion of an example implementation of a processing device 500 (or system) according to one or more aspects of the present disclosure. The processing device 500 may be or form at least a portion of one or more processing devices, equipment controllers, and/or other electronic devices shown in one or more of the FIGS. 1-6. Accordingly, the following description refers to FIGS. 1-7, collectively.

The processing device 500 may be or comprise, for example, one or more processors, controllers, special-purpose computing devices, PCs (e.g., desktop, laptop, and/or tablet computers), personal digital assistants, smartphones, IPCs, PLCs, servers, internet appliances, and/or other types of computing devices. The processing device 500 may be or form at least a portion of the equipment controllers 192, 208. Although it is possible that the entirety of the processing device 500 is implemented within one device, it is also contemplated that one or more components or functions of the processing device 500 may be implemented across multiple devices, some or an entirety of which may be at the wellsite and/or remote from the wellsite.

The processing device 500 may comprise a processor 512, such as a general-purpose programmable processor. The processor 512 may comprise a local memory 514, and may execute machine-readable and executable program code instructions 532 (i.e., computer program code) recorded in the local memory 514 and/or another memory device. The processor 512 may execute, among other things, the program code instructions 532 and/or other instructions and/or programs to implement the example methods, processes, and/or operations described herein. For example, the program code instructions 532, when executed by the processor 512 of the processing device 500, may cause the monitoring system 200 to perform the example methods and/or operations described herein. The program code instructions 532, when executed by the processor 512 of the processing device 500, may also or instead cause the processor 512 to receive, record, and process (e.g., analyze) sensor data (e.g., sensor measurements), compare the sensor data, and output data and/or information indicative of backlash and/or operational health of a drive train.

The processor 512 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Examples of the processor 512 include one or more INTEL microprocessors, microcontrollers from the ARM and/or PICO families of microcontrollers, embedded soft/hard processors in one or more FPGAs.

The processor 512 may be in communication with a main memory 516, such as may include a volatile memory 518 and a non-volatile memory 520, perhaps via a bus 522 and/or other communication means. The volatile memory 518 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 520 may be, comprise, or be implemented by read-only memory, flash memory, and/or other types of memory devices. One or more memory controllers (not shown) may control access to the volatile memory 518 and/or non-volatile memory 520.

The processing device 500 may also comprise an interface circuit 524, which is in communication with the processor 512, such as via the bus 522. The interface circuit 524 may be, comprise, or be implemented by various types of standard interfaces, such as an Ethernet interface, a universal serial bus (USB), a third generation input/output (3GIO) interface, a wireless interface, a cellular interface, and/or a satellite interface, among others. The interface circuit 524 may comprise a graphics driver card. The interface circuit 524 may comprise a communication device, such as a modem or network interface card to facilitate exchange of data with external computing devices via a network (e.g., Ethernet connection, digital subscriber line (DSL), telephone line, coaxial cable, cellular telephone system, satellite, etc.).

The processing device 500 may be in communication with various sensors, video cameras, actuators, processing devices, equipment controllers, and other devices of the well construction system via the interface circuit 524. The interface circuit 524 can facilitate communications between the processing device 500 and one or more devices by utilizing one or more communication protocols, such as an Ethernet-based network protocol (such as ProfiNET, OPC, OPC/UA, Modbus TCP/IP, EtherCAT, UDP multicast, Siemens S7 communication, or the like), a proprietary communication protocol, and/or another communication protocol.

One or more input devices 526 may also be connected to the interface circuit 524. The input devices 526 may permit rig personnel 182, 190 to enter the program code instructions 532, which may be or comprise control commands, operational parameters, pumping operations, operational health thresholds, and/or other operational set-points. The program code instructions 532 may further comprise modeling or predictive routines, equations, algorithms, processes, applications, and/or other programs operable to perform example methods and/or operations described herein. The input devices 526 may be, comprise, or be implemented by a keyboard, a mouse, a joystick, a touchscreen, a track-pad, a trackball, an isopoint, and/or a voice recognition system, among other examples. One or more output devices 528 may also be connected to the interface circuit 524. The output devices 528 may permit for visualization or other sensory perception of various data, such as sensor data, status data, and/or other example data. The output devices 528 may be, comprise, or be implemented by video output devices (e.g., an LCD, an LED display, a CRT display, a touchscreen, etc.), printers, and/or speakers, among other examples. The one or more input devices 526 and the one or more output devices 528 connected to the interface circuit 524 may, at least in part, facilitate the HMIs described herein.

The processing device 500 may comprise a mass storage device 530 for storing data and program code instructions 532. The mass storage device 530 may be connected to the processor 512, such as via the bus 522. The mass storage device 530 may be or comprise a tangible, non-transitory storage medium, such as a floppy disk drive, a hard disk drive, a compact disk (CD) drive, and/or digital versatile disk (DVD) drive, among other examples. The processing device 500 may be communicatively connected with an external storage medium 534 via the interface circuit 524. The external storage medium 534 may be or comprise a removable storage medium (e.g., a CD or DVD), such as may be operable to store data and program code instructions 532.

As described above, the program code instructions 532 and other data (e.g., sensor data or measurements database) may be stored in the mass storage device 530, the main memory 516, the local memory 514, and/or the removable storage medium 534. Thus, the processing device 500 may be implemented in accordance with hardware (perhaps implemented in one or more chips including an integrated circuit, such as an ASIC), or may be implemented as software or firmware for execution by the processor 512. In the case of firmware or software, the implementation may be provided as a computer program product including a non-transitory, computer-readable medium or storage structure embodying computer program code instructions 532 (i.e., software or firmware) thereon for execution by the processor 512. The program code instructions 532 may include program instructions or computer program code that, when executed by the processor 512, may perform and/or cause performance of example methods, processes, and/or operations described herein.

In view of the entirety of the present application, including the figures and the claims, a person having ordinary skill in the art will readily recognize that the present disclosure introduces an apparatus comprising a system for monitoring operational health of an equipment unit. The equipment unit comprises a work portion, a drive train, and an actuator operable to drive the work portion via the drive train. The drive train comprises an input member operatively connected with the actuator and an output member operatively connected with the work portion. The system comprises: a sensor operable to facilitate operational measurements indicative of an operational parameter associated with the drive train; and a processing device comprising a processor and memory storing computer program code, wherein the processing device is communicatively connected with the actuator and the sensor. The processing device is operable to: cause the actuator to move the input member until the output member moves; record the operational measurements while the actuator moves the input member; and determine a backlash of the drive train by determining a difference between the operational measurements when the input member starts to move and the operational measurements when the output member starts to move.

The processing device may be operable to determine that the drive train is worn when the backlash of the drive train is equal to or larger than a predetermined threshold backlash.

The sensor may be or comprise: a linear position sensor operable to facilitate linear position measurements indicative of a linear position of the input member; an angular position sensor operable to facilitate angular position measurements indicative of an angular position of the input member; a vibration sensor operable to facilitate vibration measurements indicative of amplitude of vibrations of the drive train; a temperature sensor operable to facilitate temperature measurements indicative of temperature of the drive train; or a sound sensor operable to facilitate sound measurements indicative of volume of sound of the drive train.

The processing device may be operable to determine a backlash time of the drive train by determining a time span between a time when the input member starts to move and a time when the output member starts to move. The processing device may be operable to determine that the drive train is worn when the backlash time of the drive train is equal to or larger than a predetermined threshold backlash time.

The equipment unit may be or comprise a top drive, a mud pump, a drawworks, a tubular handling manipulator, a catwalk, power tongs, or a shale shaker.

The present disclosure also introduces an apparatus comprising a system for monitoring operational health of an equipment unit, wherein the equipment unit comprises a work portion, a drive train, and an actuator operable to drive the work portion via the drive train. The drive train comprises an input member operatively connected with the actuator and an output member operatively connected with the work portion. The system comprises: an input load sensor operable to facilitate load measurements indicative of a load transmitted by the input member; and a processing device comprising a processor and memory storing computer program code, wherein the processing device is communicatively connected with the actuator and the input load sensor. The processing device is operable to: cause the actuator to move the input member until the output member moves; record the load measurements while the actuator moves the input member; and determine a backlash load of the drive train by determining a difference between the load measurements when the input member starts to move and the load measurements when the output member starts to move.

The processing device may be operable to, after determining the backlash load of the drive train: cause the actuator to move the input member in an opposing direction until the output member moves in an opposing direction; record the load measurements while the actuator moves the input member in the opposing direction; and determine a backlash load of the drive train in the opposing direction by determining a difference between the load measurements when the input member starts to move in the opposing direction and the load measurements when the output member starts to move in the opposing direction.

The processing device may be operable to: record the load measurements with respect to time while the actuator moves the input member; and determine a backlash time of the drive train by determining a time span between a time when the input member starts to move and a time when the output member starts to move. The processing device may be operable to determine that the drive train is worn when the backlash time is equal to or larger than a predetermined threshold backlash time.

The processing device may be operable to determine that the drive train is worn when the backlash load is equal to or larger than a predetermined threshold backlash load.

The input load sensor may be or comprise: a torque sensor operable to facilitate torque measurements indicative of a torque output by the actuator; and/or an electrical power sensor operable to facilitate electrical power measurements indicative of electrical power consumed by the actuator.

The equipment unit may be or comprise a top drive, a mud pump, a drawworks, a tubular handling manipulator, a catwalk, power tongs, or a shale shaker.

The present disclosure also introduces an apparatus comprising a system for monitoring operational health of an equipment unit, wherein the equipment unit comprises a work portion, a drive train, and an actuator operable to drive the work portion via the drive train. The drive train comprises an input member operatively connected with the actuator and an output member operatively connected with the work portion. The system comprises: an input load sensor operable to facilitate load measurements indicative of a load transmitted by the input member; and a processing device comprising a processor and memory storing computer program code, wherein the processing device is communicatively connected with the actuator and the input load sensor. The processing device is operable to: cause the actuator to move the input member until the output member moves; record the load measurements while the actuator moves the input member; determine a first backlash load of a first pair of engaging members of the drive train by determining a difference between the load measurements when the input member starts to move and the load measurements when the load measurements undergo a first increase; and determine a second backlash load of a second pair of engaging members of the drive train by determining a difference between the load measurements when the load measurements undergo the first increase and the load measurements when the load measurements undergo a second increase.

The processing device may be operable to: record the load measurements with respect to time while the actuator moves the input member; determine a first backlash time of the first pair of engaging members of the drive train by determining a first time span between a time when the input member starts to move and a time when the load measurements undergo the first increase; and determine a second backlash time of the second pair of engaging members of the drive train by determining a second time span between the time when the load measurements undergo the first increase and a time when the load measurements undergo the second increase. In such implementations, among others within the scope of the present disclosure, the processing device may be operable to: determine a first level of wear and/or degradation of the first pair of engaging members of the drive train based on the first backlash time; and determine a second level of wear and/or degradation of the second pair of engaging members of the drive train based on the second backlash time.

The processing device may be operable to: determine a first level of wear and/or degradation of the first pair of engaging members of the drive train based on the first backlash load; and determine a second level of wear and/or degradation of the second pair of engaging members of the drive train based on the second backlash load.

The processing device may be operable to determine a total backlash load of the drive train by determining a difference between the load measurements when the input member starts to move and the load measurements when the output member starts to move.

The input load sensor may be or comprise: a torque sensor operable to facilitate torque measurements indicative of a torque output by the actuator; and/or an electrical power sensor operable to facilitate electrical power measurements indicative of electrical power consumed by the actuator.

The equipment unit may be or comprise a top drive, a mud pump, a drawworks, a tubular handling manipulator, a catwalk, power tongs, or a shale shaker.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the scope of the present disclosure, and that they may make various changes, substitutions and alterations herein without departing from the scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. An apparatus comprising:
a system for monitoring operational health of an equipment unit, wherein the equipment unit comprises a work portion, a drive train, and an actuator operable to drive the work portion via the drive train, wherein the drive train comprises an input member operatively connected with the actuator and an output member to operatively move the work portion, wherein the work portion comprises a brake, and wherein the system comprises:
a sensor operable to facilitate operational measurements indicative of an operational parameter associated with the drive train; and
a processing device comprising a processor and memory storing computer program code, wherein the processing device is communicatively connected with the actuator and the sensor, and wherein the processing device is operable to:
while the brake is engaged to hold the work portion stationary, cause the actuator to move the input member in a first direction until slack and spaces in the drive train are removed;
cause the actuator to move the input member in a second, opposite direction;
record the operational measurements while the actuator moves the input member; and
determine a backlash of the drive train based on the operational measurements.

2. The apparatus of claim 1 wherein the processing device is further operable to determine that the drive train is worn when the backlash of the drive train is equal to or larger than a predetermined threshold backlash.

3. The apparatus of claim 1 wherein the sensor is or comprises:
a linear position sensor operable to facilitate linear position measurements indicative of a linear position of the input member;
an angular position sensor operable to facilitate angular position measurements indicative of an angular position of the input member;
a vibration sensor operable to facilitate vibration measurements indicative of amplitude of vibrations of the drive train;
a temperature sensor operable to facilitate temperature measurements indicative of temperature of the drive train; or
a sound sensor operable to facilitate sound measurements indicative of volume of sound of the drive train.

4. The apparatus of claim 1 wherein the processing device is further operable to determine a backlash time of the drive train by determining a time span between a time when the input member starts to move and a time when the slack is removed.

5. The apparatus of claim 4 wherein the processing device is further operable to determine that the drive train is worn when the backlash time of the drive train is equal to or larger than a predetermined threshold backlash time.

6. The apparatus of claim 1 wherein the equipment unit is or comprises a top drive, a mud pump, a drawworks, a tubular handling manipulator, a catwalk, power tongs, or a shale shaker.

7. An apparatus comprising:
a system for monitoring operational health of an equipment unit, wherein the equipment unit comprises a work portion, a drive train, and an actuator operable to drive the work portion via the drive train, wherein the drive train comprises an input member operatively connected with the actuator and an output member to operatively move the work portion, wherein the work portion comprises a load direction and a non-load direction, and wherein the system comprises:
an input load sensor operable to facilitate load measurements indicative of a load transmitted by the input member; and
a processing device comprising a processor and memory storing computer program code, wherein the processing device is communicatively connected with the actuator and the input load sensor, and wherein the processing device is operable to:
cause the actuator to move the input member in a first direction associated with the load direction of the work portion until slack and spaces in the drive train are removed to zero the drive train;
cause the actuator to move the input member in a second, opposite direction associated with the non-load direction of the work portion to work through the slack and spaces of the drive train;
record the load measurements while the actuator moves the input member; and
determine a backlash load of the drive train based on the load measurements.

8. The apparatus of claim 7 wherein the processing device is further operable to:
record the load measurements with respect to time while the actuator moves the input member; and
determine a backlash time of the drive train based on the load measurements with respect to time.

9. The apparatus of claim 8 wherein the processing device is further operable to determine that the drive train is worn when the backlash time is equal to or larger than a predetermined threshold backlash time.

10. The apparatus of claim 7 wherein the processing device is further operable to determine that the drive train is worn when the backlash load is equal to or larger than a predetermined threshold backlash load.

11. The apparatus of claim 7 wherein the input load sensor is or comprises:
a torque sensor operable to facilitate torque measurements indicative of a torque output by the actuator; and/or
an electrical power sensor operable to facilitate electrical power measurements indicative of electrical power consumed by the actuator.

12. The apparatus of claim 7 wherein the equipment unit is or comprises a top drive, a mud pump, a drawworks, a tubular handling manipulator, a catwalk, power tongs, or a shale shaker.

13. An apparatus comprising:
a system for monitoring operational health of an equipment unit, wherein the equipment unit comprises a work portion, a drive train, and an actuator operable to drive the work portion via the drive train, wherein the drive train comprises an input member operatively connected with the actuator and an output member operatively connected with the work portion, and wherein the system comprises:
   an input load sensor operable to facilitate load measurements indicative of a load transmitted by the input member; and
   a processing device comprising a processor and memory storing computer program code, wherein the processing device is communicatively connected with the actuator and the input load sensor, and wherein the processing device is operable to:
      cause the actuator to move the input member until the output member moves;
      record the load measurements while the actuator moves the input member;
      determine a first backlash load of a first pair of engaging members of the drive train by determining a difference between the load measurements when the input member starts to move and the load measurements when the load measurements undergo a first increase; and
      determine a second backlash load of a second pair of engaging members of the drive train by determining a difference between the load measurements when the load measurements undergo the first increase and the load measurements when the load measurements undergo a second increase.

14. The apparatus of claim 13 wherein the processing device is further operable to:
   record the load measurements with respect to time while the actuator moves the input member;
   determine a first backlash time of the first pair of engaging members of the drive train by determining a first time span between a time when the input member starts to move and a time when the load measurements undergo the first increase; and
   determine a second backlash time of the second pair of engaging members of the drive train by determining a second time span between the time when the load measurements undergo the first increase and a time when the load measurements undergo the second increase.

15. The apparatus of claim 14 wherein the processing device is further operable to:
   determine a first level of wear and/or degradation of the first pair of engaging members of the drive train based on the first backlash time; and
   determine a second level of wear and/or degradation of the second pair of engaging members of the drive train based on the second backlash time.

16. The apparatus of claim 13 wherein the processing device is further operable to:
   determine a first level of wear and/or degradation of the first pair of engaging members of the drive train based on the first backlash load; and
   determine a second level of wear and/or degradation of the second pair of engaging members of the drive train based on the second backlash load.

17. The apparatus of claim 13 wherein the processing device is further operable to determine a total backlash load of the drive train by determining a difference between the load measurements when the input member starts to move and the load measurements when the output member starts to move.

18. The apparatus of claim 13 wherein the input load sensor is or comprises:
   a torque sensor operable to facilitate torque measurements indicative of a torque output by the actuator; and/or
   an electrical power sensor operable to facilitate electrical power measurements indicative of electrical power consumed by the actuator.

19. The apparatus of claim 13 wherein the equipment unit is or comprises a top drive, a mud pump, a drawworks, a tubular handling manipulator, a catwalk, power tongs, or a shale shaker.

* * * * *